(12) United States Patent
Jilk et al.

(10) Patent No.: US 6,859,523 B1
(45) Date of Patent: Feb. 22, 2005

(54) UNIVERSAL TASK MANAGEMENT SYSTEM, METHOD AND PRODUCT FOR AUTOMATICALLY MANAGING REMOTE WORKERS, INCLUDING ASSESSING THE WORK PRODUCT AND WORKERS

(75) Inventors: David J. Jilk, Broomfield, CO (US);
Brian L. Kellner, Superior, CO (US);
Victor Ganora, Louisville, CO (US);
Thomas A. Kotsines, Denver, CO (US)

(73) Assignee: Qgenisys, Inc., Englewood, CO (US)

( * ) Notice: Subject to any disclaimer, the term of this patent is extended or adjusted under 35 U.S.C. 154(b) by 455 days.

(21) Appl. No.: 10/001,498

(22) Filed: Nov. 14, 2001

(51) Int. Cl.[7] .............................. H04M 1/24; H04M 3/00
(52) U.S. Cl. ............................... 379/32.01; 379/265.01; 379/265.03; 379/265.05; 379/265.06; 379/265.12; 379/32.02
(58) Field of Search ........................... 379/32.01, 32.02, 379/9, 9.02, 9.01, 9.03, 265.01, 265.02, 265.03, 265.04, 265.05, 265.06, 265.09, 265.1, 265.12, 266.07, 266.09; 705/8, 9, 11; 709/100, 104, 202, 223, 224

(56) References Cited

U.S. PATENT DOCUMENTS

| | | | |
|---|---|---|---|
| 5,181,162 A | 1/1993 | Smith et al. ................. 364/419 |
| 5,185,780 A | 2/1993 | Leggett ........................ 379/34 |
| 5,557,515 A | 9/1996 | Abbruzzese et al. ........ 364/401 |
| 5,581,691 A | 12/1996 | Hsu et al. .............. 395/182.13 |
| 5,594,791 A | * 1/1997 | Szlam et al. ............ 379/265.09 |
| 5,644,619 A | * 7/1997 | Farris et al. ............. 379/29.01 |
| 5,671,360 A | 9/1997 | Hambrick et al. .......... 395/209 |
| 5,721,913 A | 2/1998 | Ackroff et al. ............. 395/614 |
| 5,737,494 A | 4/1998 | Guinta et al. ................. 395/10 |
| 5,825,869 A | 10/1998 | Brooks et al. .............. 379/265 |
| 5,836,011 A | 11/1998 | Hambrick et al. .......... 395/208 |
| 5,950,169 A | 9/1999 | Borghesi et al. ............... 705/4 |
| 5,987,302 A | 11/1999 | Driscoll et al. ............. 434/353 |
| 6,002,760 A | 12/1999 | Gisby .......................... 379/266 |
| 6,023,572 A | 2/2000 | Lautzenheiser et al. ...................... 395/500.23 |
| 6,038,544 A | * 3/2000 | Machin et al. ................. 705/11 |
| 6,049,599 A | * 4/2000 | McCausland et al. ........ 379/111 |
| 6,070,142 A | 5/2000 | McDonough et al. .......... 705/7 |
| 6,088,679 A | 7/2000 | Barkley .......................... 705/8 |
| 6,101,545 A | 8/2000 | Balcerowski et al. ....... 709/230 |
| 6,115,693 A | 9/2000 | McDonough et al. ......... 705/10 |
| 6,128,646 A | 10/2000 | Miloslavsky ................ 709/206 |
| 6,134,530 A | * 10/2000 | Bunting et al. ................. 705/7 |

(List continued on next page.)

Primary Examiner—Quoc D. Tran
(74) Attorney, Agent, or Firm—Kent A. Lembke, Esq.; Hogan & Hartson, LLP

(57) ABSTRACT

A computer implemented method, a system, and a software product to automatically manage one or more human workers carrying out a process of manipulating source data provided to produce result data. The process including a set of one or more task steps each having an input and resulting in a task result. The computer implemented method includes receiving units of source data from a customer. For each unit of source data and each task step for the unit of source data, the method includes dispatching the task step and its corresponding input unit to a worker and, after the worker carries out the dispatched task step on the input unit, receiving the task result corresponding to the dispatched task step and input unit from the worker. Each worker is certified to have one or more task skills, wherein each task step requires a corresponding task skill, and wherein the dispatching of any task step occurs automatically substantially without human management to a worker who is certified to have the corresponding task skill of the task step. The method further includes assessing at least some of the task results of at least some of the task steps for at least some of the units of source data. A version of the method further includes generating the result data for the unit of source data from one or more of the task results corresponding to the task steps of the set and sending the result data for the unit of source data to the customer.

79 Claims, 9 Drawing Sheets

U.S. PATENT DOCUMENTS

| | | | |
|---|---|---|---|
| 6,138,104 A | 10/2000 | Marchak et al. | 705/9 |
| 6,178,239 B1 | 1/2001 | Kishinsky et al. | 379/265 |
| 6,185,292 B1 | 2/2001 | Miloslavsky | 379/265 |
| 6,236,977 B1 | 5/2001 | Verba et al. | 705/10 |
| 6,247,128 B1 | 6/2001 | Fisher et al. | 713/100 |
| 6,453,038 B1 * | 9/2002 | McFarlane et al. | 379/265.05 |
| 6,539,419 B2 * | 3/2003 | Beck et al. | 709/204 |
| 6,675,151 B1 * | 1/2004 | Thompson et al. | 705/9 |

* cited by examiner

UNIVERSAL TASK MANAGEMENT SYSTEM, METHOD AND PRODUCT FOR AUTOMATICALLY MANAGING REMOTE WORKERS, INCLUDING ASSESSING THE WORK PRODUCT AND WORKERS

RELATED PATENT APPLICATIONS

This invention is related to the following two concurrently filed patent applications:

U.S. patent application Ser. No. 10/001,947 entitled UNIVERSAL TASK MANAGEMENT SYSTEM, METHOD AND PRODUCT FOR AUTOMATICALLY MANAGING REMOTE WORKERS, INCLUDING AUTOMATICALLY TRAINING THE WORKERS, Jilk, et al., inventors, agents, assigned to the assignee of the present invention.

U.S. patent application Ser. No. 10/002,962 entitled UNIVERSAL TASK MANAGEMENT SYSTEM, METHOD AND PRODUCT FOR AUTOMATICALLY MANAGING REMOTE WORKERS, INCLUDING AUTOMATICALLY RECRUITING WORKERS, Jilk, et al., inventors, agent, assigned to the assignee of the present invention.

Both of these patent applications are incorporated herein by reference.

BACKGROUND

This invention relates to automated management of tasks, in particular to a method of defining information-based tasks and for a method of automatically supervising and assessing manpower for carrying out the defined tasks remotely with substantially no human management.

There has recently been a dramatic trend toward workplace flexibility. Flextime, telecommuting, and other changes reflect the need of workers to have more control over their work lives. Even with these changes, however, many individuals still find traditional work schedules inconvenient or untenable. Stay-at-home parents, college students, retirees, moonlighters, and "ski bums" all either prefer or would require the ability to work on the schedule of their choice from home. There thus has been a long-felt need by workers for work they can perform at their own pace, time, and place.

At the same time, employers have found it increasingly difficult to hire competent and productive full-time staff to perform their high-volume but fundamentally manual tasks. In addition, many such tasks sustain severe volume fluctuations, leading to either excessive overhead (if staffed for peak load) or organizational stress (if understaffed and requiring overtime or temporary workers). There has also long been an incentive to hire remote workers working in remote locations for tasks, e.g. small, easily definable, information-based tasks. There has also been a long-felt need to reduce management overhead. The benefits of using a remote workforce include low facility costs and a much wider pool of workers. There thus has arisen a whole class of companies that outsource many different types of information-based tasks that include, without limitation, data entry, telesales, transcription, translation, and editorial work. Managing such remote workers has always been a challenge.

Workflow software is known for helping manage a complex task. Workflow software allows one to break down a complex task into smaller tasks, and to keep track of the carrying out of each of the smaller tasks that make up a complex task. Workflow software mainly provides a bookkeeping function—rules and checks and bounds—to ensure that the complex task is preformed correctly and to keep track of the carrying out of the various smaller tasks. Management however is still carried out by human beings.

Software exists for automatically managing some specific types of tasks. By automatically is meant substantially without human management. However, this software is task specific. For example, there exists call center and customer relationship management (CRM) software to automatically route telephone calls and/or emails to remote workers (called agents in this context). In a call center, a relatively large number of agents (who may be remote) handle telephone communication with clients. The matching of calls between clients and agents is typically performed by software. The software routes the call to the agent best suited to handle the call based on predefined criteria (e.g., language skill, knowledge of products the customer bought, etc.). The software also immediately transfers relevant information about the client to a computer screen used by the agent. Thus, the agent can gain valuable information about the customer prior to receiving the call. As a result, the agent can more effectively handle the telephone transaction.

See for example U.S. Pat. No. 6,002,760 describing a universal queue for a call center. U.S. Pat. Nos. 6,128,646 and 6,185,292 describing skill-based dispatching of calls and emails in a call center, U.S. Pat. No. 6,178,239 for using a Petri net to model the operation of a call center, and U.S. Pat. No. 5,185,780 for predicting the workload in a call center. See also U.S. Pat. Nos. 6,070,142, 6,134,530 and 6,115,693 for simulating a sales center.

As a further example, software exists for managing remote workers carrying out the production of content for publications, e.g., managing manuscript reviewers, photographers, and contributors. See for example the Outerforce Platform from Outerforce Systems, New York, N.Y.

As a further example, software exists for managing remote workers carrying out data entry tasks such as viewing scanned filled-in forms and filling in fields based on viewing these forms.

While each of these task-specific systems includes many of the features that are desirable for managing remote workers, none has all the features desired to automatically manage, i.e. to manage substantially without human management, any type of worker working on any type of small information-based task.

Furthermore, no software is known to the inventors that provides a universal task management system, i.e., a system that can be configured to automatically and simultaneously manage—substantially with no human management—a combination of different types of remote workers carrying out different types of tasks.

SUMMARY

Described herein is a system, method, and software product that automatically manages people working on a task. One embodiment is a computer implemented method to automatically manage one or more human workers carrying out a process of manipulating source data provided to produce result data. The process includes a set of one or more task steps each having an input and resulting in a task result. The method includes receiving units of source data from a customer. For each unit of source data and each task step for the unit of source data, the method includes dispatching the task step and its corresponding input unit to a worker and, after the worker carries out the dispatched task step on the input unit, receiving the task result corresponding to the dispatched task step and input unit from the worker. Each worker is certified to have one or more task skills, wherein each task step requires a corresponding task skill, and wherein the dispatching of any task step occurs automatically substantially without human management to a worker who is certified to have the corresponding task skill of the task step. The method further includes assessing at least some of the task results of at least some of the task steps for at least some of the units of source data. A version of the method further includes generating the result data for the unit of source data from one or more of the task results corresponding to the task steps of the set and sending the result data for the unit of source data to the customer.

DETAILED DESCRIPTION

The Tasks of a Project

The inventive system provides automated task management for managing one or more human workers carrying out task steps included in a process of manipulating an item of source data to produce an item of result data. Thus, the process includes a set of one or more task steps. Each task step has a task input and produces a task result (work product). Completing a task step on a unit of task input results in a unit of the task result corresponding to the task step. When there is no actual output, the result data may be an indication that the work is done.

While the invention is not limited to any particular type of manipulation process, it is designed for carrying out processes that have the following attributes:

Information manipulation. The typical task step of a process involves manipulating information—e.g., electronic information-rather than manipulating physical objects. The information typically is accessible electronically. The input to a task could be as little as an identifier for the task. Furthermore, the task result may be no more than an indication that the task is completed. Thus, the task result data could be non-electronic, but the worker would then send the system an electronic message to indicate completion of a task.

Granularity. The typical task step is "granular," meaning that it is a small task step. A typical task step may take as little as 5 minutes or less to complete, and can take as long as an hour or more to complete.

Repeatability. The typical task step is repeatable, meaning that the same manipulation rules are applied to the same type of task input to produce the same type of task result.

Disconnectedness. The typical task step is disconnected in that it typically requires little or no communication prior to completion, including little or no interaction with another worker (i.e., collaboration) or a supervisor.

High volume if high priority. If a process is to be carried out with high time priority, then there preferably is a sufficiently high volume to balance the time sensitivity. Any low time priority processes are handled well whether high or low volume.

A typical process may include only one task step or several task steps. For the purpose of explanation, however, unless explicitly stated otherwise, this description assumes that each process includes only one task step.

Examples of typical task steps that may be managed by embodiments of the invention include, without limitation, the steps involved in data entry, telesales, voice transcription, translation, image categorization, sales lead incubation, auditing, repair of documents after OCR, photo retouching, paralegal processes, call center quality assurance, and editorial work. A task step also may be checking the result of carrying out another task step.

Figure 1:
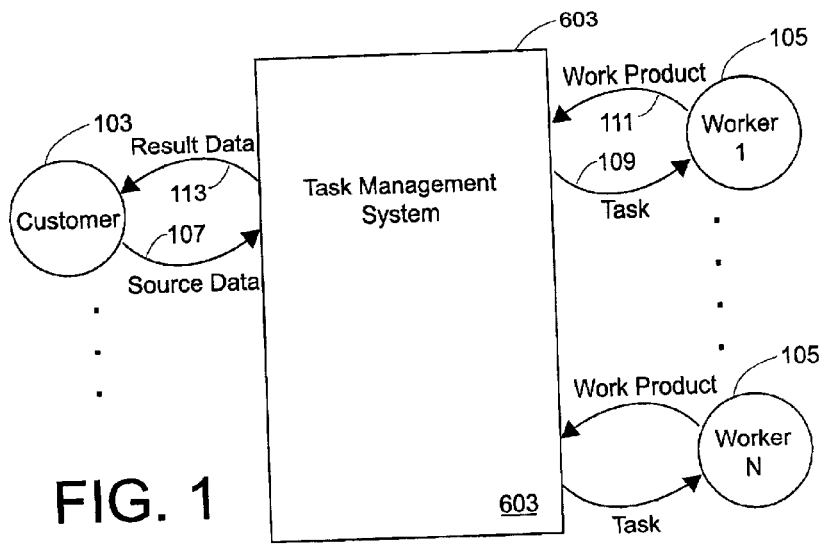
FIG. 1 shows the information flow between a customer, an embodiment of the inventive task management system, and one or more workers.

Operation:

FIG. 1 shows the information flow between a customer 103, an embodiment of the inventive task management system 100, and one or more workers 105. The customer 103 requires a project to be performed and contracts with an operator of a task management system (the "system operator") such as system 100. A project, also called an "application," is a task step, or a set of task steps that is to be carried out on some source data. A project may define a single process that is carried out on a unfit of source data, or different process versions that each may be carried out on a unit of source data. A "job" is a project and an associated set of units of source data—source data items—submitted by a customer 103. The customer 103 defines the one or more processes of the project, including the task steps of each process, and the process definitions are entered into the system 100.

An example may be useful to explain the concept of process versions of a project. Suppose a customer has a telesales project that involves workers calling prospects on the telephone. The customer may define different versions of the telesales project. For example, there may be a Texas process for telesales in the state of Texas, and a California process for carrying out telesales in the state of California. Suppose defining each process in such an example includes defining where the source data units are found, what qualifications a worker is required to have, and where the results are to be submitted. One or more of these may differ depending on whether it is the Texas telesales process or the California telesales process. For example, it may be that for the California process, the worker needs to be in-state. Furthermore, the processes may include different steps. For example, the California telesales process may include an additional step required to meet California law, and so forth. Thus, the telesales project will include a California process and a Texas process, each process versions of the project.

Once the project and its one or more processes are defined, the customer 103 enters units of source data 107 into the system 100. Workers belong to the system, i.e., are system users. A worker may log on to the system 100 and request work. The task management system 100 then dispatches a task step and an associated amount of task input data to the worker. A "task" is the task step with its associated unit of data. The unit of data that defines a unit of work for a task step is called a "source set." Thus, tasks (shown as 109) required for the job are assigned to a worker 105 when that worker requests a task. In general, the system may be assigning similar tasks to one or more (in general N) workers 105. A worker 105 carries out the assigned task 109 by carrying out the task step on the assigned task source set and sends the task result 111 that results from carrying out the task 109 back to the task management system 100. The task management system 100 sends finished result-data 113 back to the customer 103.

Figure 2:
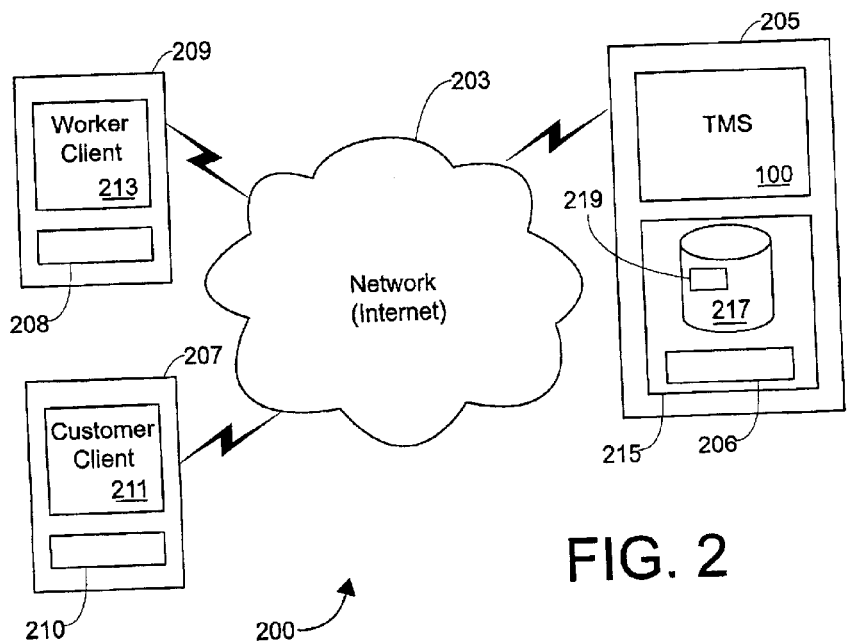
FIG. 2 shows a client/server implementation that includes an embodiment of the inventive task management system 100.

In one embodiment, the system is implemented as a client/server system 200 as shown in FIG. 2. Communication between the task management system 100 and customers is then through a network 203. In one embodiment, the network 203 is the Internet. A server computer system 205 is coupled to the network 203 and includes one or more computer readable code segments (e.g., software) that may be provided on a carrier medium 206 (e.g., a computer readable medium) that cause one or more processors in the server computer system 205 to implement the task management system 100 as a server process. In a particular embodiment, the carrier medium 206 is part of a storage subsystem 215 of the server computer system 205. The server computer system may be local or distributed, and may be operated by a separate entity from that operating the task management system 100. Thus, the server computer system need not be dedicated to the task management system 100 or even to the entity that operates the task management system 100.

The storage subsystem 215 of the server computer system 205 contains a database 217 storing information on users of the system, such as the customers and the remote workers. The data on each remote worker includes one or more tasks skills of the worker that define the types of task steps the worker is certified to carry out. The database 217 further includes information on each process. The process information including the customer of the process, the order of carrying out the task steps of the process, how the input for each task step is obtained from the results of prior task steps in the process, and any pre-processing and post-processing required.

The storage subsystem 215 further stores a task data structure 219 that includes a task pool of tasks to be completed, each task defined by a task step and a unit of input for the task step. In the embodiment shown in FIG. 2, the task data structure 219 is part of the database 215, and in alternate embodiments, the task data structure 219 is a separate data structure.

The storage subsystem 215 further includes a data store for storing input and output information for the tasks. The data store may store the actual data, or information on where to locate the data, e.g., URLs for the items of data.

The storage subsystem 215 may be local or distributed.

A customer computer system 207 coupled to the network 203 includes one or more computer readable code segments (e.g., software) that may be provided on a carrier medium 208 and that cause one or more processors in the customer computer system 207 to implement a customer client process 211 communicating with the task management system 100 via the network 203. The customer computer system may be part of the customers network, e.g., an intranet.

Included is at least one worker terminal 209 coupled to the network 203 including one or more computer readable code segments (e.g., software) that may be provided on a carrier medium 210 and that cause one or more processors in the worker terminal 209 to implement a worker client process 213 communicating with the task management system 100 via the network 203. More worker terminals such as 209 would operate, typically, one per remote worker.

Each worker terminal 209 may be a computer system such as a conventional personal computer. When secure communication is required, the customer 103 computer (or just the customer 103 client process 211) or the worker terminal (or just the worker client process 213) or both workers and customers may connect to the server computer system 205 (or just the task management system 100), for example by becoming part of a virtual private network (VPN).

While FIG. 1 shows the task and result data moving between a worker and the task management system 100, the entire set of source data may not be moving. A worker, for example, may carry out the task via the Internet using a Web based application running using a browser on the worker's terminal and the source data would not be returned from the worker's terminal to the task management system.

Figure 3:
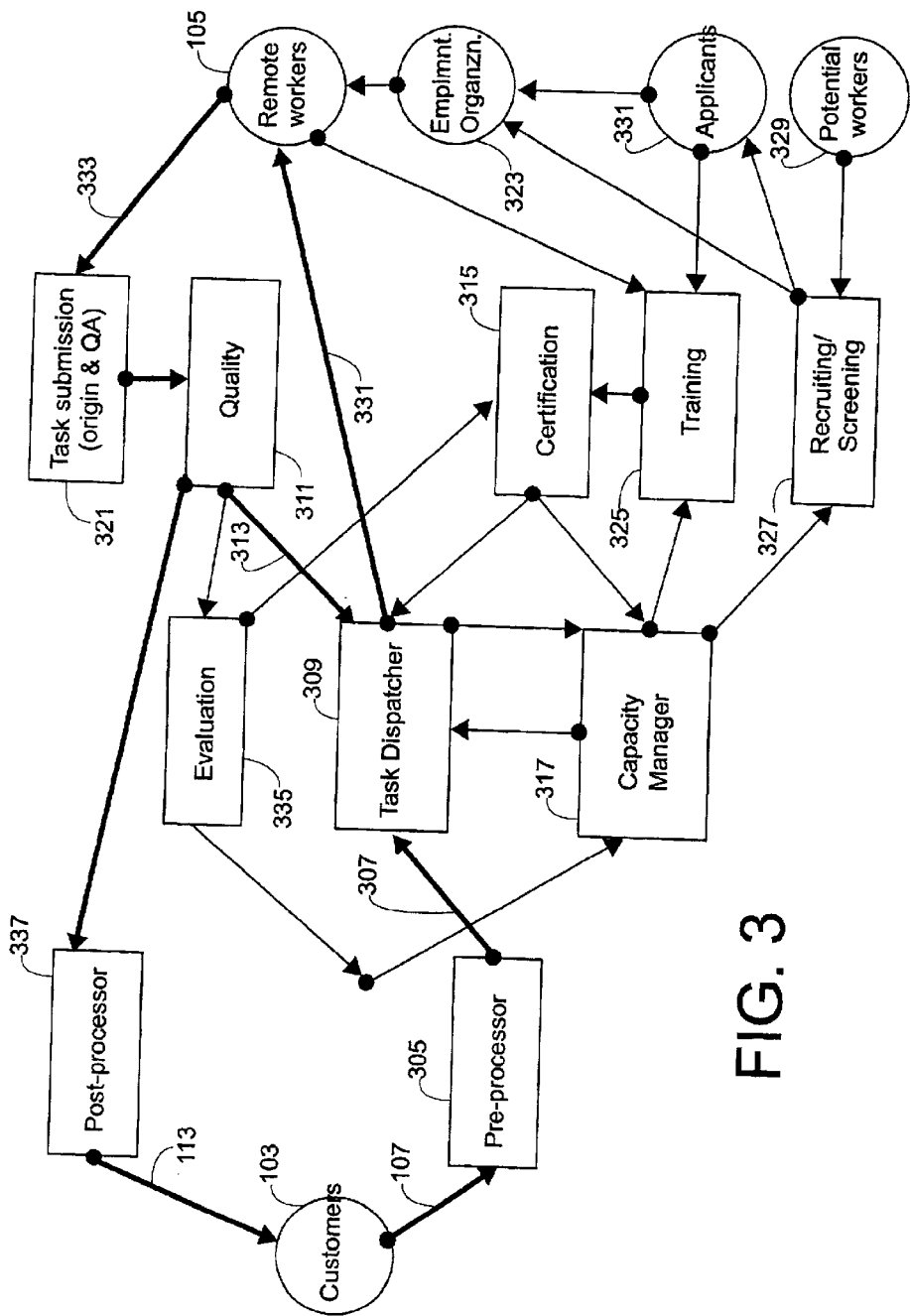
FIG. 3 shows the logical modules of an embodiment of the task management system, the interaction of the modules and the data flow between them.

FIG. 3 shows the logical modules of the task management system 100. Also shown is the interaction of the modules and the data flow between them. Bold links show the movement of tasks and non-bold links show the flow of other information. Information typically flows in the task management system 100 via the database 217. Customers, workers, and other entities that interact with the task management system 100 are enclosed by circles. Interaction with the task management system 100 is via a network, e.g., the Internet. Thus, a connection to an entity enclosed by a circle in FIG. 3 is assumed to be a network connection to that entity.

Each customer 103 has an entry in database 217. When a customer 103 contracts a project with the operator of the task management system 100, the customer 103 also defines the type of data (the source data 115) that will be sent to the system 100 for each process in the project, and the type of data to be returned (the result data 113). These all form entries in the database 217. Task definition includes defining the overall process of manipulating the source data to produce the result data for each process, and the individual task steps that are make up the overall process in the case that the process includes more than one task step. For each task step, the one or more manipulation rules that convert the task input data to the task result are defined and entered into the task management system 100. These are input as entries in the database 217.

In one embodiment, the task management system 100 provides different access to different types of users, e.g., applicants, workers, managers, and administrators. An applicant is a potential worker who has undergone system screening and is provided access to the system. An applicant who is hired becomes a worker. A manager is a system user who works as a manager, and may also be a worker. Each worker has a user profile stored in the database 217. In one embodiment, workers may self-administer their own profile information. A manager can administer worker information. In one embodiment, an administrator can administer task process information. In one embodiment the task management system 100 includes configurable options to control system behavior defined by one or more parts of the database 217.

Once the project is defined, units of source data 107 for the project are entered by a customer 103, e.g., from the customer 103 client process 211 on the customer 103 computer system 207. The units of source data 107 may be provided to the system 100 automatically as soon as available with substantially no human interaction. For example, suppose that a customer is an entity that operates a translation service and that the customer's clients submit work for translation via the Internet. The customer client process 211 in such a case could automatically submit new units of source data 107 to the task management system 100 to carry out a previously defined translation process whenever a customer's client submits work for translation.

Link 107 typically is via the network, and in one embodiment, the task management system 100 includes a pre-processor 305 coupled to the network for receiving the source data and carrying out any defined preprocessing procedure that includes converting the submitted source data into a format suitable for the one or more task steps of the process. The preprocessor 305 identifies and prevents basic errors such as duplicate source material imports, importing files with viruses, and importing unsupported file types. Setting up the preprocessing procedure may require engineering effort as part of the project definition, but the ongoing operation of it does not require support. The preprocessing, once set up, is entered into the database 217 and associated with the project. The output of the pre-processor is in the form of source sets (input data) and task steps, i.e., tasks, with each task 307 including a unit of input data and an identifier to the task step to be carried out on the input data.

Thus a pool of tasks exists, stored in the task data structure 219 kept in the storage subsystem 215 of the server computer system. The task pool includes new tasks 307 from the pre-processor and tasks 313 resulting from rejections that occur in an included quality unit 311. A task originating from the pre-processor 305 is sometimes called an "origin" task 307. The dispatcher 309 also receives new quality assessment tasks (QA tasks) from the quality unit 311 that result from submission of origin tasks.

A task dispatcher 309 assigns the tasks from the task pool. The dispatcher assigns origin and QA tasks to qualified workers based on basic business rules and worker qualifications and the task skills that the worker is certified to have. A task skill is an ability that can be tested by the system 100. A "certified" worker is one who has been certified as having one or more particular task skills. Each task skill may have an associated task skill level, indicated by "quality level" for the task skill. A "qualification" is a fact that cannot be verified by the system, e.g., that the worker has a particular degree, or lives in a particular area, or has a medical transcription certificate granted by some third party.

The dispatching of tasks (origin and QA) is according to a set of dispatch rules. In one embodiment, the dispatching of each task is carried out by forming a relatively complicated query on the database 217.

The task dispatcher 309 receives information on how to assign tasks to workers based on input from a certification unit 315 and a capacity manager 317. The input may be in the form of additional entries—or modification to existing entries—in the database 217. Input from the certification unit 315 provides the task dispatcher with information on the task skills and associated quality levels of workers and the workers' qualifications. These pieces of data determine which tasks the workers are "certified" to perform.

Workers 105 log in to the task management system 100, e.g., by running the worker client process 213 on the worker's terminal 209. In one embodiment, whenever tasks are available, workers are automatically notified of task availability by the task dispatcher 309, e.g., using email, and may then log into the system to be assigned one or more tasks. In another embodiment, the notification occurs only when a worker logs into the task management system 100.

In one embodiment, the task dispatcher 309 automatically dispatches a task to a qualified worker when such a worker logs in to the task management system 100. The task dispatcher 309 dispatches tasks according to the dispatch rules. In another embodiment, the task dispatcher 309 only dispatches a task to a worker—again following a set of one or more dispatch rules—only when that worker requests a task.

When tasks are entries in the database 217, each task entry may include a priority that is used by the task dispatcher to dispatch tasks. In an alternate embodiment, the task dispatcher 309 maintains a data structure that describes the priority for distributing tasks (the "distribution priority data structure"). The capacity manager 317 provides input to the task dispatcher 309 on which tasks should be raised higher in the distribution priority data structure.

In addition to carrying out assigned tasks, a worker 105 may also carry out training scenarios run by a training unit 325 that is provided in one embodiment. One type of training scenario includes, for example, practicing a task step. Another type of training scenario is taking a task skill test. A worker 105 thus may practice task steps and then take task skill tests using the training unit 325. A worker thus may also update his or her user profile.

A worker 105 completes the task for the dispatched task and submits the resulting task result unit to the task management system 100, e.g., via the network 203 to a provided task submission unit 321. The task submission unit 321 controls the execution of the task and ensures that the task result is submitted within the allowable time for the task, or returned to the task pool. In one embodiment, the task submission unit 321 also provides task-specific error checking to ensure high data quality.

One embodiment includes quality assessment (QA) managed by a quality unit 311 of the task management system 100. The quality unit 311 controls setting the quality standards for tasks or groups of tasks, and controls evaluating the task result to determine if it passes the corresponding quality standard. In one embodiment, the quality unit samples the task results and returns a sampled task result to the dispatcher to be dispatched to one or more QA workers who carry out the QA as a task. The quality unit determines the frequency with which that task result is sampled to both ensure quality levels for customers and to verify worker performance.

The system 100 provides for configuring various QA parameters. The sampling rates, tolerance levels, quality assessment method, worker evaluation method are settable, e.g., as entries in the database 217. Some possible types of QA methods include: 1) sequential checking of results in which a task is dispatched to a worker and that worker's results are subsequently reviewed by another worker as a subsequent task, and 2) a comparison of two independent results in which the same task is dispatched to two different workers and the results compared.

In one embodiment, the worker's performance is additionally evaluated by an evaluation unit 335 of the task management system 100. The evaluated result is sent to a post-processor 337. The post-processor implements an automatic post-processing procedure. The post-processed results are then sent ("exported") as result data to the customer 103. Post-processing may include translating the evaluated task result to the format required as result data. Post-processing also may be required, for example, in the case that the process includes more than one task step. The formatting and distribution may occur automatically upon completion of the quality assurance or, in another embodiment, by manual exporting.

Workers may be certified for different task skills at different levels of task skill by a provided certification unit 315. The certification of each worker in one embodiment is maintained in entries of the database 217. The evaluation process carried out by the evaluation unit 335 provides for promoting those workers that produce consistently high performance to higher quality levels of task skill, and for disqualifying a worker who performs below an acceptable level of performance.

In one embodiment, the evaluation unit 335 is coupled to the capacity manager 317 and provides error rate, productivity, and other evaluation data that may relate to capacity.

In the case that the QA carried out by one or more other workers (QA workers) and so dispatched as a task by the dispatcher 309 of the task management system 100, the performance of QA worker's task step is evaluated by the evaluation unit 335 in a similar manner to the performance evaluation of workers carrying out the main tasks of the process.

The capacity manager 317 in the task management system 100 performs capacity management including checking observed productivity and quality results versus current and projected workloads and predicting worker demand a period into the future. In one embodiment, this is done by analyzing the database 217. The prediction period is settable. The capacity manager 317 is coupled to the dispatcher 309, e.g., via the database 217, and may change dispatch rules and the priority of tasks.

The capacity manager 317 takes input from the certification unit on the task skills (and qualifications) of workers to carry out task steps and takes input from the dispatcher 309 on current dispatch rules and the current task load. One embodiment of the task management system 100 includes a store of historical data such as average number of tasks, actual work time for each worker, and so forth, and one embodiment of the capacity manager 317 receives data from the store of historical data.

The capacity manager 317 provides information to the task dispatcher 309 on how to adjust the dispatch sequence. In one embodiment, the capacity manager 317 modifies the data in the database 217 that the dispatcher queries when dispatching a task. In another embodiment that uses a distribution priority data structure 319, the capacity manager 317 modifies this structure. The capacity manager 317 also provides input to the training unit 325 on what training scenarios such as task step practice, task step instruction, and task skill tests to make available to workers based on the distribution of tasks in the task data structure, the required task skills, and available workers having the required task skills. In one embodiment, the capacity manager 317 can send email to existing workers to encourage them to certify in new tasks as a way to deal with excess workload.

In one embodiment, the capacity manager 317 also is coupled to a recruiting unit 327 provided in some embodiments of the system 100 (see below). The capacity manager 317 instructs the recruiting unit 327 to begin a recruiting campaign if projected worker requirements cannot be met by using the current work force nor by cross-training members of the current work force.

In one embodiment, the capacity manager 317 also looks at forecasted task loads and provides alerts to the operators of the task management system 100 on specific expected shortfalls.

One embodiment of the system 100 includes a set of human resources (HR) modules to that provide for training existing workers and for recruiting additional workers to add capacity to the system, e.g., for any particular job. One embodiment of the task management system 100 also provides for accepting application for employment from potential workers, and for training and certifying workers or potential workers. Thus, potential workers can apply for and undergo training, such as practicing, learning, or skill tests on task steps before being hired as workers.

The training unit 325 accepts input from the capacity manager 317 on what training scenarios to offer. The training unit also provides for existing workers to certify them for particular tasks at particular task skill quality levels.

The set of HR modules includes a recruiting unit 327 that implements recruiting and screening procedures. The recruiting unit 327 is coupled to the capacity manager 317 and thus receives notification that additional workers need to be added to the system 100. It will then determine the most effective recruiting campaign to attract workers with the required qualifications and pursue and measure that campaign. In one embodiment, the recruiting unit includes placing advertisements, e.g., online advertisements on the World Wide Web via the Internet, to attract potential workers.

In one embodiment, the recruiting unit 327 further automatically converts a potential worker 329 into an applicant 331. For this, the recruiting unit 327 administers a screening test, preferably online. If a potential worker passes the screening test, the potential worker may go through an application process administered by the recruiting unit 327 to become an applicant. The application process includes assigning a user ID and password to the new applicant, and collecting basic user information on the new applicant 331.

An applicant may undergo training managed by the training unit 325. The training unit trains the applicant, preferably online, and administers one or more task-specific task skill tests. Upon completing training and task skill test, the user profile of an applicant is changed to reflect the skill and quality level. Qualified applicants may be converted into hired workers 305. Such qualified workers may already have one or more task skills.

After the system 100 determines an applicant 331 should be hired, the recruiting unit 327 will notify an employment organization (EO) 323 such as an employment agency or a human resources department to conduct the steps that happen outside the system 100 as part of a regular human resource function, e.g. obtaining the necessary taxation forms, social security information, and so forth.

Note that a worker is also an applicant. Thus a worker may undertake training (e.g., task practice) that he or she is qualified for that is offered by the training unit 325.

In one embodiment, when a shortage of workers is expected, the EO 323 is notified to hire qualified and certified applicants. This converts an applicant into a worker 105 capable of logging into the system 100 and performing tasks.

The structure of each of the modules of the task management system 100 is now described in more detail.

Operation of the Overall System

The task management system 100 uses database 217 that the different modules of the system may access and modify. In one embodiment, the modules communicate with each other by accessing and modifying elements in the database 217. Consider, as an example, the training unit 325 accepting input from the capacity manager 317 on what training scenarios to offer. One embodiment implements this communication by the capacity manager 317 modifying the database as demand changes, and by the training unit 325 accessing the database to determine what training scenarios to offer.

The Database

FIGS. 4A to 4D form a simplified entity-relationship (ER) diagram that describes a relational database used in one embodiment of the task management system 100. Other embodiments may use an object-oriented database or a flat file implementation or any other database structure. Alternate embodiments also may use different data structures.

Figure 4A:
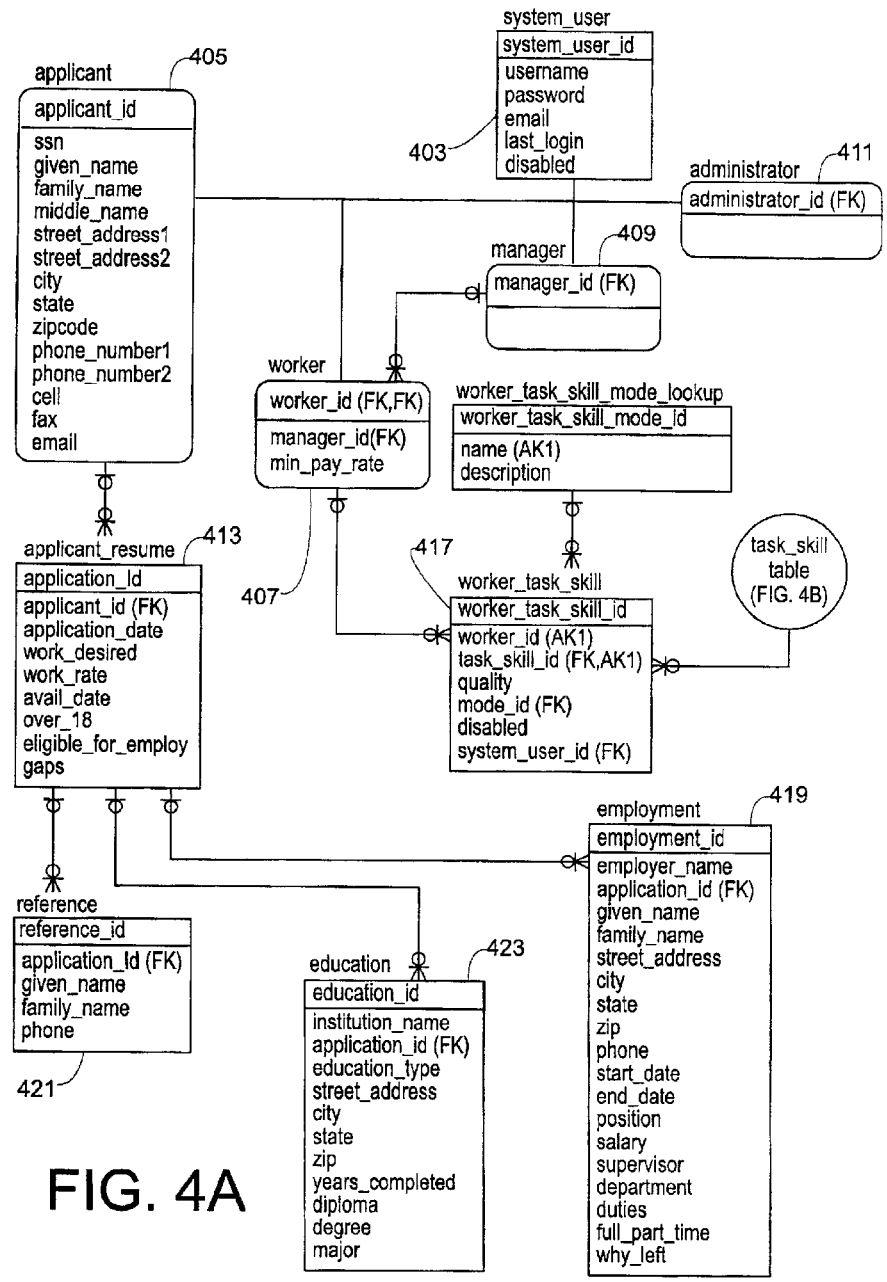
FIGS. 4A to 4D form a simplified entity-relationship (ER) diagram that describes a relational database used in one embodiment of the task management system 100.

FIG. 4A shows the elements of the database 217 that describe the users of the system 100. A user has an entry in a system_user table 403. An applicant, a worker, a manager and an administrator are each a subtype of a system user and have an entry in an applicant table 405, a worker table 407, a manager table 409 and an administrator table 409, respectively. An applicant may be related to one or more entries in an applicant_resume table 409. Each entry in the applicant_resume table 409 may be related to one or more entries in a reference table 421, an education table 423, and an employment table 419 that describes previous employment.

Each manager entry may be associated with one or more entries in the worker table. Note that a manager may also be a worker as indicated by having the same system_user_id. Each entry in the worker table may have a minimum acceptable pay rate indication.

Each worker entry in the worker table may be related to one or more entries in a worker_task_skill table 415 to indicate the task skill or skills the worker is certified for. One of the elements of an entry of the worker_task_skill table 415 is the quality of the task skill of the worker, a measure that in one implementation is between 1 and 100. Another element of an entry of the worker_task_skill table 415 is the worker_task_skill mode_id, shown as mode_id. The modes of a worker in a particular task skill may be "training"-also called "practice"-indicating the worker may train in this skill but not yet work, "test" indicating that the worker has trained to beyond a threshold that allows him or her to take a test, and "normal," which indicates the worker may work on tasks that require this task skill. A lookup table 417 called worker_task_skill_mode_lookup has the entries of the different mode_id's used.

The embodiment using the tables of FIGS. 4A–D does not include storing qualifications. A qualification is a fact about the worker that may be required to perform a particular task step. For example, a worker must have a medical transcription certificate granted by a third party to perform medical transcription. How to modify the database to include qualifications would be straightforward to one skilled in the art. For example, the database may be modified by adding a qualification table with each entry identified by an identifier (qualification_identifier), and having a qualification name (qual_name), a qualification description (qual_descr), and possible values. Some qualifications may require validation, e.g. by a manager. The qualification values may be a separate table, called qual_value. A worker qualification table (worker_qualification) may then be related to the qualification table and to the worker table.

Figure 4B:
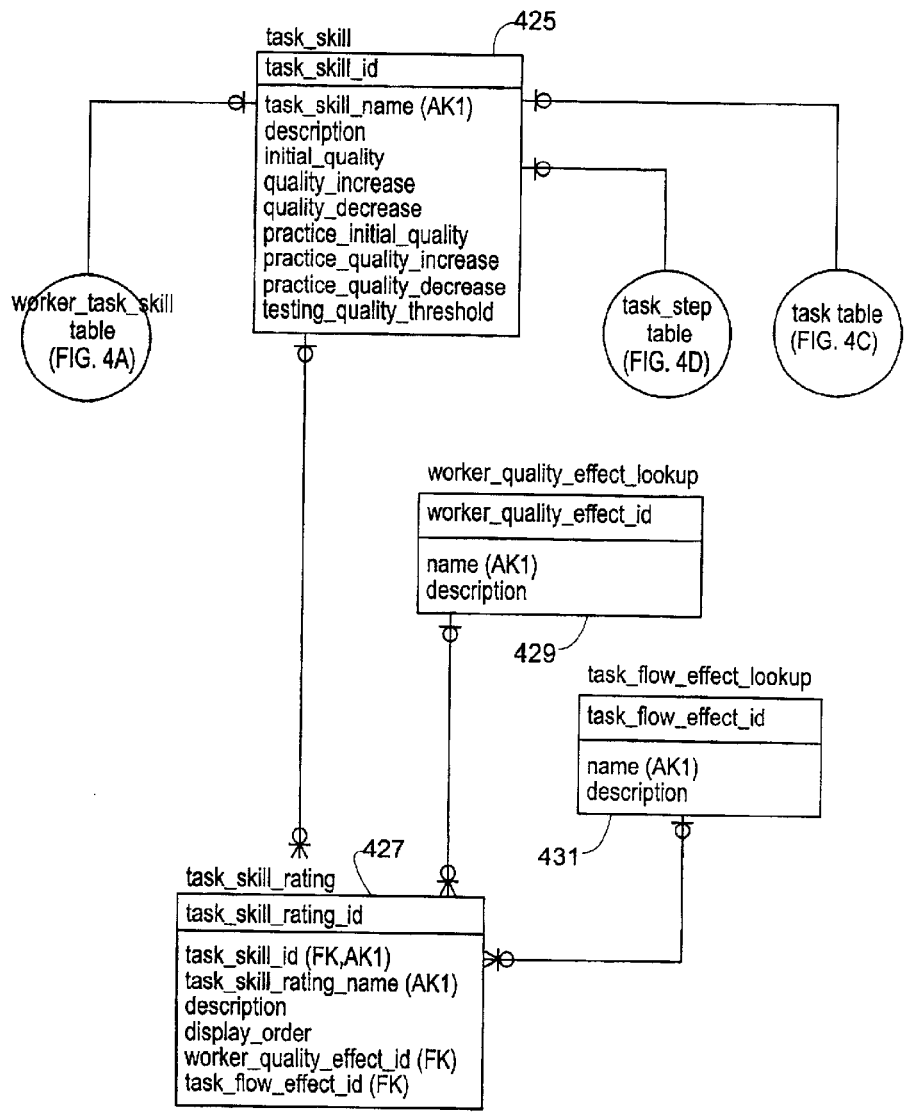

FIG. 4B shows the elements in database 217 that describe the task skills of the system 100. Each task skill has an entry in a task_skill table 425. Each entry may include an initial_quality value that indicates the quality related to a worker when the worker first passes the test for this task skill, e.g., 50 out of 100. Each task skill entry may also include a practice_initial_quality value that indicates the quality related to a worker when the worker first starts training on the task skill. The value of practice_quality_increase defines a method to determine the amount by which the worker's quality increases as the worker undergoes training at a level and succeeds, while practice_quality_decrease similarly defines the amount by which the worker's quality decreases after failure. These may be fixed numbers, or in another embodiment, point to an algorithm. Similarly, a worker may be rated by a QA worker and have his or her quality level increase or decrease. The values of quality_increase and quality_decrease respectively define methods to determine the amount by which the worker's quality increases and decreases as the worker receives positive and negative QA rating, respectively. Again, these may be fixed numbers, or in another embodiment, point to an algorithm. The testing_quality_threshold defines the threshold of quality level a worker needs to reach to be allowed to take the test for that task skill.

Note that in one embodiment, the quality level is a fine measure between 1 and 100. In another, these fine quality levels are stored in the database, but also are translated to different grades, e.g., between 1 and 5, with 5 being the highest.

Each task skill may be related to one or more entries in the worker_task_skill table 415 of FIG. 4A. Each task skill may also be related to one or more entries in a task_step table that has task step entries (see below), and may also be related to one or more entries in a task table that has entries for tasks (see below).

Each entry of the task_skill table 425, i.e., each task skill, may be rated, as indicated by one or more entries in a task_skill_rating table 427. The task skill rating is how a QA worker rates another worker's task skill, e.g., as acceptable, marginal, or unacceptable. Each entry in the task_skill_rating table 427 may include the display_order which describes how a pull down menu may appear on the screen of a QA worker's computer system. A particular rating may have an effect on the worker's quality rating and may also have an effect on the task flow. These are indicated by a worker_quality_effect_id entry and a task_flow_effect_id entry, respectively, and these entries in turn are values that are in a worker_quality_effect_lookup table 429 and task_flow_effect_lookup table 431, respectively. The entries in the worker_quality_effect_lookup table 429 provide the possible effects that a QA worker can have on an origin task worker, e.g., "success," indicating the origin worker's quality rating is changed by an amount for success, "no effect," or "failure," the latter indicating that the origin worker's quality rating is changed by an amount for failure. The entries in the task_flow_effect_lookup table 429 are the actions that the task management system 100 may cause as a result of a QA worker reviewing the task result, for example "continue," indicating the next task step is carried out, "repair," indicating the task result is to be immediately repaired, or "return to pool," indicating that the task is to be returned to the pool of tasks in order to be carried out again. Thus the invention provides for modifying worker's rating as a result of QA tasks, and also for repairing or otherwise assuring a required level of task completion quality.

Figure 4C:
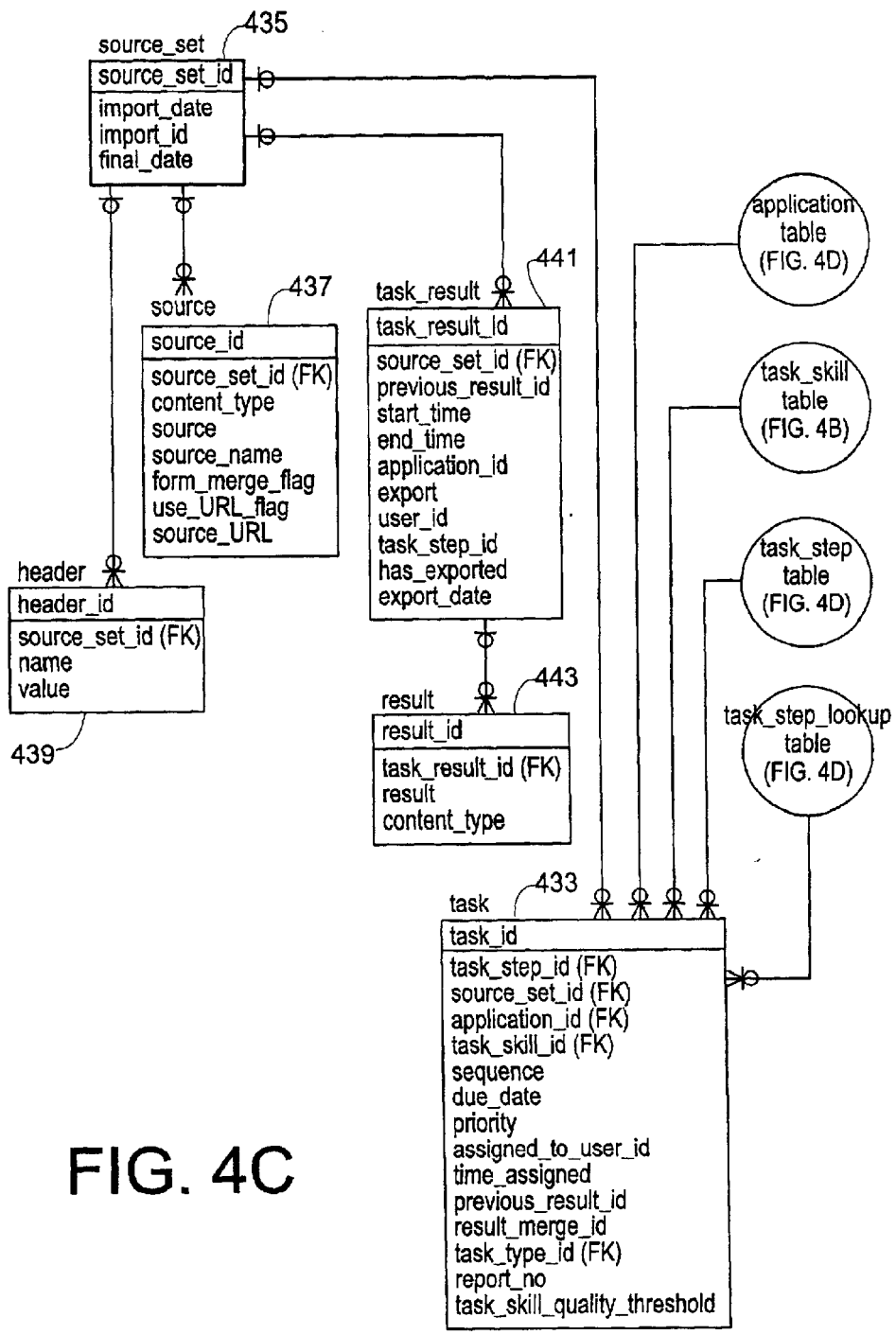

A task is a task step together with a source set. A source set is the source material for a unit of work on the task step. Thus a "task" is a transient entity that is assignable to a worker. It is transient in the sense that it no longer exists when satisfactorily completed. In general, the tasks of the task pool are in the task data structure 219. In one embodiment, the tasks of the task pool in the task management system 100 are kept as entries in a task table shown as table 433 of database 217 in FIG. 4C. FIG. 4C also includes the tables of database 217 that are used to describe the source data for tasks and the result of completed tasks.

Table 435 is the source_set table and has entries for each set of source material for a unit of work. An entry in the source_set table may be related to an entry in a source table 437 for the source data itself. Each source entry of the source table 437 may include the source data, or if an included flag called use_URL_flag is set, a URL (source_URL) that specifies the location of the source data. A source_set table entry may also be related to an entry in a table called the header table that contains the contents of a header (e.g., in a http://header) that indicates to a browser such as a browser operating on the workers' computer system how to interpret the source data. Each source set entry of table 435 may also be related to one or more tasks, i.e., to entries of the task table 433. As can be seen in FIG. 4C, each task table entry may include a sequence number that indicates what the task step is of the task, what the source set is for this task, what project—called an "application" in FIGS. 4A–4D—the task step is part of, and what task skill is needed. A task entry of table 433 also may include a number called sequence that indicates where in a sequence of task steps of a process this task step lies, an identifier (previous_result_id) to identify the previous result, the due date, a priority, the task type, and any task skill quality level threshold for this task. When assigned to a worker, the user_id of the worker may be included in a task entry of table 433 as well as the time assigned. If the results need to be merged, an identifier of the result merge also is included.

A source set entry of table 435 may also be related to one or more task result entries of an included task_result table 441. A task result entry may include an identifier to a previous result appropriate for the task, the start time, the end time, what task step the result is of, what project—indicated by application_id—the result belongs to, and who produced the result. A flag called export indicates if this is a result that is to be exported, e.g., to a customer. An intermediate result of a sequence of task steps may not need to be exported. If an exportable result, an entry may include a flag called has_exported to indicate that the result has been exported, and the export date.

Each entry in the task_result table 441 may be related to one or more results, each an entry of an included result table 443.

Figure 4D:
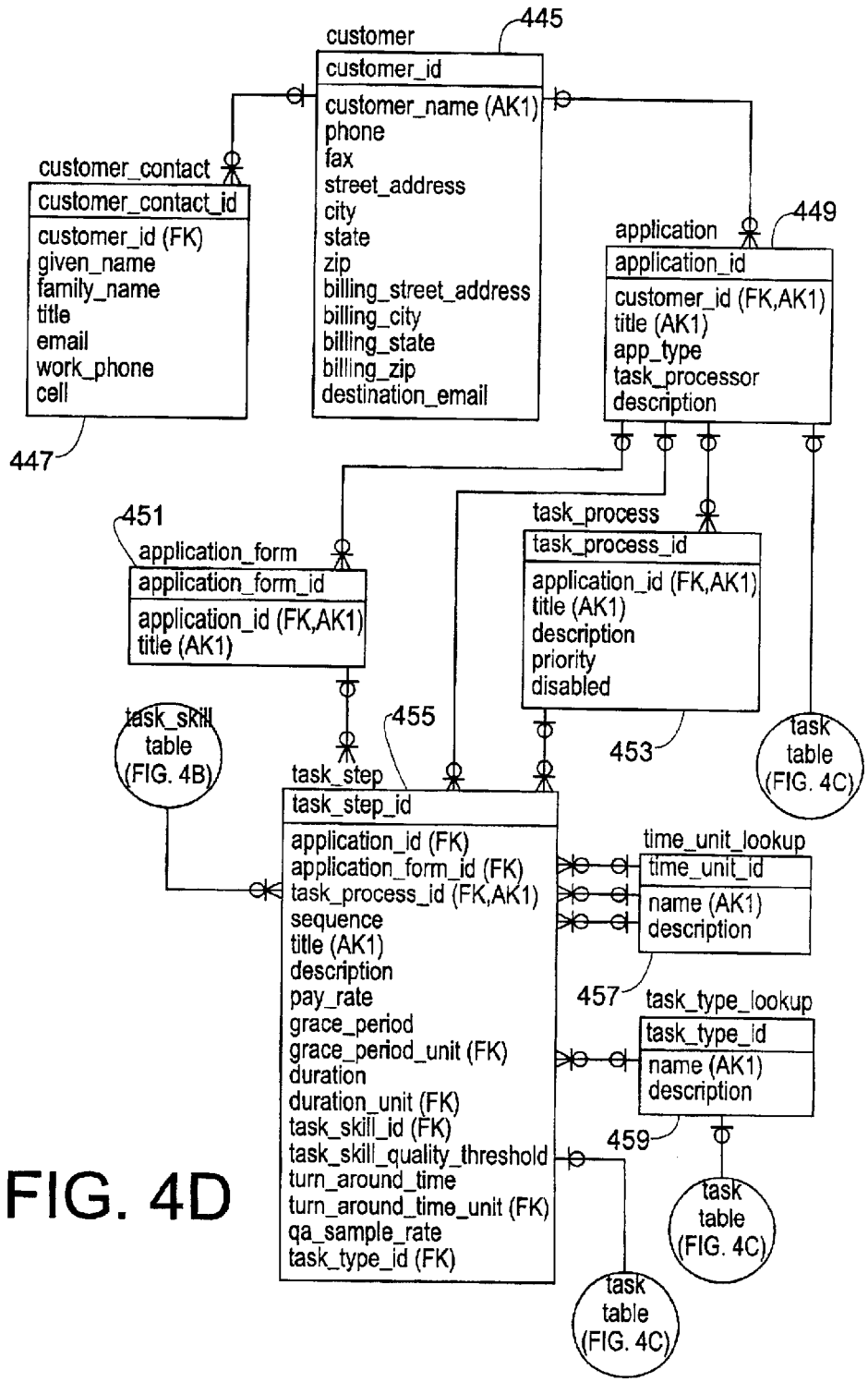

FIG. 4D shows tables included in database 217 that relate to customers, projects, processes, and the task steps of the processes. Each customer has an entry in a customer table 445. Each customer entry may be related to one or more customer contact entries in a customer_entry table 447. Each customer further may have one or more projects, and such is indicated by the customer entry in customer table 445 being associated with one or more application entries in an application table 449 (an application is an alternate term for a project). Each project entry in the application table may include an identifier app type to indicate the type of project, a verbal description (called description) and a title. Some projects require some pre-processing or some post-processing, or both, and such processing is described by processor. Post processing may include, for example, combining different results of different task steps of the process of the project. In one embodiment that uses the Java programming environment, processor identifies a Java class that is associated with the project type or with the particular project.

Some projects may require the worker on the task step or steps to fill in one or more forms. Thus, an entry of the application table 449 may be related to one or more entries in a table 451 of database 217 called application_form.

A project may be related to one or more task process versions. Thus, an entry of the application table 449 may be related to one or more entries in a table 453 of database 217 called task_process that contains an entry for each task process. Each task process may have a priority indicated by an integer value, and this priority may be used by the task dispatcher module of the task management system 100. Each project entry in the application table 449 also may be related to one or more entries of the task table 433 (FIG. 4C). A project entry in the application table 449 also may be related to one or more task steps, each step indicated by an entry in a table 455 called task_step.

A typical process includes one or more task steps, so each entry of the task_process table 453 may be related to one or more entries of the task_step table 455. An entry in the task_skill table 425 (FIG. 4B) also may be related to one or more entries in the task_step table 455, so that each task step may require the worker to have a particular task skill. Not shown is that the task step may specify that only a worker possessing particular values of qualifications is "certified" to perform that step.

A task step entry may include a sequence number if the task step is part of a process in which task steps are to be performed in a particular order. There also may be several time periods included in a task step entry. One embodiment provides for three time periods: a grace period, a duration for the task step, and a turn-around time. Different time units may be used for such times, and the units in one embodiment are indicated by the index in a lookup table that lists the allowable different time units. The lookup table is shown as time_unit_lookup table 457.

The task management system 100 allows for different task types, including, without limitation, a "work" task that takes source data and generates result data, a "QA" task, a "second opinion" task, and a "scoring" task. In one embodiment, the task type is indicated by an index, task_type_id, to a lookup table 459 called task_type_lookup that describes the different acceptable task types. The task type index may be included in one or more entries of the task_step table 455 and/or of the task table 433 (FIG. 4C).

Each task step may have one or both of an associated QA sample rate and a required task skill quality level threshold that a worker needs to have to carry out the task step. The element pay_rate of an task step entry may in one embodiment be used to indicate the maximum amount of pay a worker may receive for carrying out the task, or, in another embodiment, the actual hourly rate of pay a worker will receive for carrying out the task step.

Each task step entry may be related to one or more entries in the task table 433 (FIG. 4C) that includes entries for the tasks that are dispatched to workers.

The modules of FIG. 3 of the task management system 100 use the information stored on one or more tables of the database 217, and may further create new entries or modify existing entries. In one embodiment, the modules of FIG. 3 are implemented using components written in the Java language, specifically, "Entity JavaBeans" that are written to carry out various functions. Entity JavaBeans are objects that are written in the Java programming language that may be used to create applets or applications. Alternate implementations may use other programming languages and conventions.

Note that the separation of the task management system 100 into modules is functional, and is not meant to imply that each module is written as a separate computer program.

For example, the functions of the task manager 309 and of the capacity manager 317 are provided in one embodiment by sets of JavaBeans that operate on the server computer system 205 and cause the computer system to carry out operations on the database 217 that are required for the task dispatch and capacity management functions.

To continue with the task manager 309 and capacity manager 317 example, the functionality of these "modules" may alternately be implemented as two sets of computer programs, e.g., in any language or form. Even if written as computer programs, because the function of these modules are closely related, in an alternate embodiment, a single module may be built to carry out both task dispatch and capacity management functions.

Operation of the Task Dispatcher and the Capacity Manager

Figure 5A:
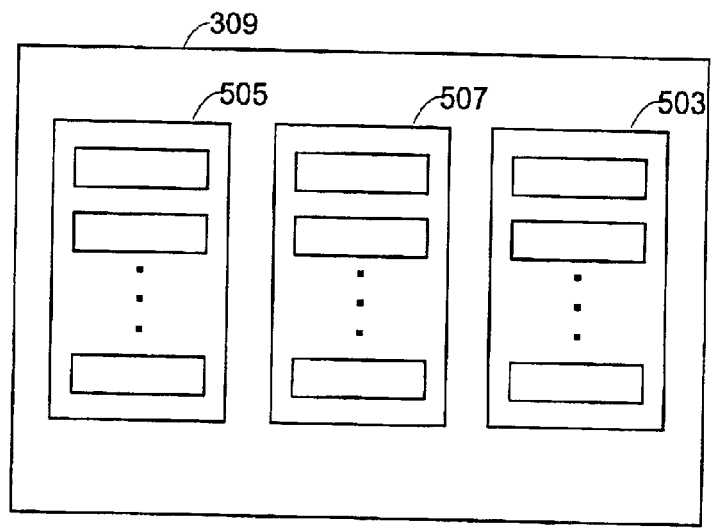
FIG. 5A shows a functional block diagram of an embodiment of the task dispatcher 309 of the task management system 100.

FIG. 5A shows a functional block diagram of the task dispatcher 309 that causes the computer system 205 to assign tasks to workers 105 using the database 217. The task manager includes a set of dispatch rules 503 that provide for determining whether it is allowable for that worker to carry out a particular task at a particular time while meeting the business objectives of the task management system 100. The task dispatcher further includes a set of task dispatch objectives 505, e.g., on-time task completion, that provide for meeting customer goals while producing an economic return to the system operator.

Special business situations may exist which will modify the normal behavior of the task dispatcher 309. In one embodiment, the task dispatcher 309 includes a set of special dispatch cases 507 that are provided to the dispatcher, typically during task definition.

Figure 5B:
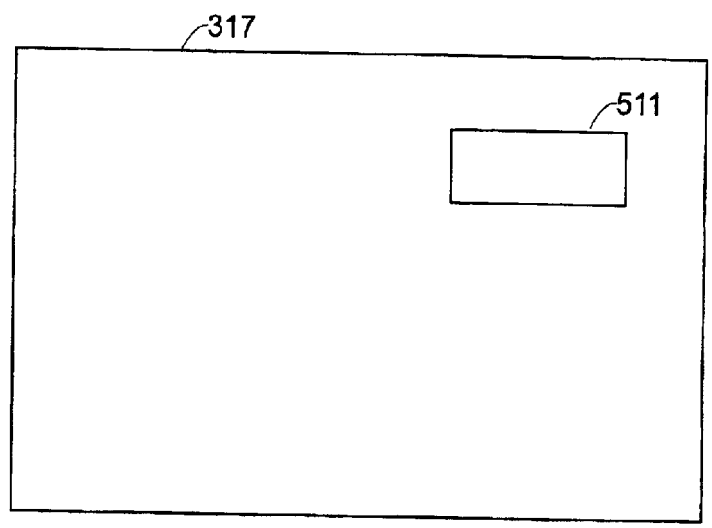
FIG. 5B shows a functional block diagram of an embodiment of the capacity manager 317 of the task management system 100.

In one embodiment, the task dispatcher 309 assigns a task to any worker who meets the dispatch rules to meet the dispatch objectives 505. In another embodiment, the dispatcher dispatches tasks to optimize an optimality function defined to operate the system and provided to the capacity manager 317. FIG. 5B shows a functional block diagram of the capacity manager 317 showing the optimality function 511 that in one embodiment is a function of the business objectives 505. One or more constraints such as quality requirements and integrity conditions are applied in optimizing the optimality function 511. The capacity manager 317 evaluates the optimality function 511 and determines if there is a solution that optimizes the optimality function 511 with the resources available. Many methods and software implementations are available for optimizing optimality functions. The field of optimizing such functions is generally referred to as operations research.

Note that while the dispatch objectives are shown in FIG. 5A in the task dispatcher 309, some or all of the objectives may be stored elsewhere in the system and made available to both the task dispatcher 309 and the capacity manager 317.

Dispatch Rules

The task dispatcher 309 is programmed to assign a task if one or more conditions are met by the worker (the dispatch rules, also called the dispatch conditions). In one embodiment, the task dispatching involves running a query on the database 217, e.g., by forming a SQL statement that might be complicated.

The following list of dispatch conditions is in order of priority. Which conditions are requirements and which are preferences is determined in one embodiment during the task definition.

Qualification condition. A worker must be qualified and have a task skill at the appropriate quality level for the task 109. This may be indicated in the database 217, for example, by task_skill_id and task_skill_quality_ threshold of the entry in the task_step table 455 for the task step of the task.

Integrity condition. A worker may not carry out a QA task on his or her own task result 111. Note that one embodiment includes a quality test that includes comparing the results of carrying out the same task twice and automatically comparing the results. For such QA, a worker should not get the same task twice for comparison of the results. Note that such QA may be used for origin tasks or QA tasks.

EO Condition. The worker may be required to belong to a specific employment organization to be assigned a particular task. In one embodiment, the EO requirement may be part of the qualification condition expressed in the worker's task skill, i.e., one qualification is membership in a particular EO.

Time Window Condition. A task may have a constraint that it can only be performed between certain times. In one embodiment, what times a worker is able to work may be part of the worker's task skill.

Minimum Pay Condition. In one embodiment, a worker may specify a minimum pay rate he or she is willing to accept. The minimum may be an hourly rate or a piece-rate. In one implementation, when the tasks are charged a piece rate but the worker is paid an hourly rate, historical data is used to determine whether the minimum hourly rate of the worker is acceptable for task at hand.

Task Steps and Security Conditions. A process may include a plurality of task steps. The system permits distributing the tasks of the different task steps to more than one worker. In such an embodiment, there may be some processes that for security—or for one or more other reasons—are required to be split into task steps that have to be carried out by different workers. For such a process, one worker may not be assigned different tasks of the same process, or should not be assigned tasks that enable him or her to associate the different task steps of a process. Furthermore, there also may be a requirement that a worker getting the origin task of a process may not be assigned the QA task of a different task of the same process.

Task Dispatch Objectives

The task management system 100 may have one or more task dispatch objectives 505 it is pursuing that would determine which is the most desirable task to distribute at any instant in time, and to whom to distribute each task, while complies with the dispatch rules 503. For example, the most desirable task may be the highest priority task. In one embodiment wherein the tasks are maintained in the database 217, each task entry may include a priority.

In one embodiment, a set of task dispatch objectives 505 is stored in the task dispatcher 309. The system 100 may be set up to have only one objective, e.g., on-time completion, or a primary objective that may be overridden by one or more special cases. For example, the primary objective may be on-time completion, but any scheduled commitments would have even higher priority.

One embodiment of the system provides different dispatch objectives to different customers and/or for different projects.

The following is a list of dispatch objectives that different embodiments of the system may use or that may be set up by a customer or system operator.

On-Time Completion Objective. In one embodiment, on time completion is the primary objective. The capacity manager 317 estimates the probability of a sufficient quantity of worker hours being available prior to the due date to determine the priority input that describes to the task dispatcher 309 which tasks should be distributed first to give the best chance of completing the work before the due date.

Scheduled Commitment Objective. One embodiment of the system 100 provides for specifying time constraints tasks, i.e., constraints as to when tasks need to be carried out including one or more of start times, end times, days of the week, dates, and so forth. For example, telesale tasks may be limited to certain times of the day. A telesale may further lead another task, e.g., a call back at a specific time. This scheduled time could be totally independent of due date. Note that any repeating scheduled time, e.g., any day between 2 pm and 3 pm, is best set up as a time window condition dispatch rule. A scheduled commitment task may be associated with a scheduled worker, e.g., a worker commits to being on the system 100 during a certain time period to accept one or more tasks or a worker may commit to call a customer at a particular time. The task dispatcher 309 would then include as a dispatch objective matching up the scheduled worker with the one or more scheduled tasks.

ASAP Completion Objective. One embodiment of the system 100 may provide for real-time or near-real-time integration with another system, e.g., a second instance of the task management system. A task is input from the other system into the system and is required to be completed as soon as possible and returned to the other system. Such a task may have a higher priority assigned to it than to other tasks.

Lowest Cost Objective. While it is anticipated that in normal operation, all workers working on a particular task are paid at the same rate, an embodiment of the system 100 provides for different workers receiving different pay rates for the same task. One of the set 505 of dispatch objectives in such an embodiment may be lowest cost, according to which the task dispatcher 309 assigns a task to the lowest-cost available worker. For the case of piecework and workers being paid by the hour, the task dispatcher 309 may include a formula to estimate the piece rate of a worker based on the hourly rate of the worker. An embodiment of the system may provide for incentive bonus and an incentive trigger such as a time that triggers an incentive. For example, the task step pay rate may increase from $7 per hour to $10 per hour 24-hours before the due date. An embodiment of the system may include in such a case a lowest cost dispatch objective according to which such incentive pay is minimized.

Best Productivity Objective. One common assumption is that workers perform better when they carry out the same type of task for a few repetitions than when they receive a different type of task each time. For example, it is common to assume that it is less efficient for a worker to be assigned a telesales task and then immediately an image categorization task and then another telesales task followed by another image categorization task, and so forth than for the worker to be assigned a set of image categorization tasks followed by a set of telesale tasks. However, certain types of tasks may get too tedious if carried for an extended period, so that a certain level of variety may help productivity and/or quality. One embodiment of the system 100 is configurable to meet varying such productivity objectives.

Optimal Quality Objective. One embodiment of the system 100 provides for the customer 103 or the system operator or both defining a quality target, and for such a quality target being one of the dispatch objectives. A minimum quality level of task skill may be defined as being required to perform a particular task to meet the quality target. In one embodiment, the task dispatcher 309 seeks to distribute the tasks to workers of different task skill quality levels according to a particular distribution in order to improve the probability of meeting the quality level. For example, suppose that it has been determined a worker certified to "level 1" has 95% accuracy and that one certified to "level 2" has 99% accuracy. Suppose further that the quality target is 97% accuracy. In such an example, the task dispatcher 309 might aim to dispatch half of the total tasks to level 1 workers and half to level 2 workers to achieve the target 97% quality objective. One implementation of the system includes defining a cost to each available worker who achieves a particular quality, providing the distribution of workers and the quality each worker achieves, e.g., according to the task skill quality level of the worker, and determining the dispatch that minimizes the cost while achieving a target quality objective. This defines an optimization problem that may be solved by a program implementing an optimization method.

Best Response Time Objective. The system 100 may include in the set of dispatch objectives 505 dispatching tasks as quickly as possible. Such an objective may then be selected as the primary objective, in which case the system 100 will seek to minimize making frequent or complex decisions about task assignment.

Worker Reward Objective. The system 100 may include in the set of dispatch objectives 505 dispatching the most "rewarding" tasks according to a task desirability criterion to workers who have the best performance. One such embodiment may provide for each worker a mechanism to indicate which type of work is most rewarding, e.g., highest pay rate, work that requires a particular task skill, and so forth. The system 100 thus in one embodiment uses task dispatch as a motivational tool. The system 100 may also include as an objective that certain tasks require a task skill quality level that can only be attained by a highly productive or accurate worker, so highly productive or highly accurate workers will automatically be "rewarded" with such certain tasks.

Minimum Wage Management Objective. Because some tasks may be paid by a per-piece rate or a below-minimum wage task pay rate situation, one embodiment of the system may include as a dispatch requirement that each worker receives on average at least a pre-defined minimum wage. There are many ways the dispatch may be carried out to achieve this objective. For example, the task dispatcher 309 might mix some above minimum wage pay tasks with below minimum wage tasks to ensure an average rate above the minimum. This avoids assigning a worker below-minimum wage tasks such that the system would then need to additionally pay the worker the difference to ensure the worker receives the minimum wage. Alternately, the objective may be met using task skill and having a corresponding minimum pay associated with the task skill quality level, such that the task dispatcher 309 does not assign tasks that are below the minimum pay rate to a worker above a certain quality level of task skill and that defines approximately the minimum rate. For piece rate, one embodiment monitors productivity and decertifies a worker who does not complete enough tasks to achieve his or her minimum wage.

Special Dispatch Cases

The task dispatcher 309 includes a set of special dispatch cases. Examples include Two-Worker Comparison Special Case. In one embodiment, one of the special cases 507 enables a two-worker comparison, either as a QA task configured to compare two task results of an origin case, or as a validation of a QA worker's task result. When a two-worker comparison task is assigned, the task dispatcher 309 creates a second copy of the task to be compared, ensuring that the newly created task is not assigned to the same worker of the comparison.

Returned To Task Pool Special Cases. One embodiment of the invention provides special task-step specific rules that apply to tasks that are returned to the pool. For example, one embodiment provides for configuring the dispatcher 309 to include or not include with the task the prior-results when re-dispatching the task. One embodiment further includes configuring the dispatcher 309 to permit or not dispatching a returned-to-the-pool task to the same worker who was assigned the earlier version of the task.

Hopeless Objectives. It is possible that an objective may become impossible for the system 100. For example, the system may have on-time completion as a primary objective, and a task appears for dispatch that is past its due date. In one embodiment, when such a case occurs, a special case is invoked. For example, the special case may state that when a past due task appears for dispatch, the task dispatcher 309 abandons the primary objective. The abandonment may be programmed to be only for the task, or for the whole project.

Out Of System User Rights Special Cases. Suppose system 100 is in communication with a second management system that requires a worker to have one or more user "rights" to perform tasks. For example, suppose that the remote worker needs to be able to log into the second system, or into to a third system and have particular rights on that system, such as file access rights. One embodiment of the system provides for the task dispatcher 309 to check with the second system or even the third system to determine the workers credentials on that system. Such a check may include checking LDAP directories, active directories, and other user credential systems.

Out of System Tasks Special Cases. Suppose again that the task management system 100 is in communication with a second management system and suppose that there are no tasks in system 100 when a remote worker requests a task. One embodiment of the system includes as a special case the task dispatcher 309 interrogating the second system to identify a task that the worker can be assigned. The task dispatcher 309 causes the task to be assigned to the worker in the second system. In one embodiment, the results are submitted by the worker solely in the second management system, and the second management system then sends back notification to the task management system 100 of completion. One embodiment of the system 100 includes code that provides the task management system 100 to act as a first task management system in communication with a second management system including sending a worker request to be assigned a task to the second management system and receiving information about completion of the task from the second task management system. One embodiment of the system 100 includes code that provides the task management system 100 to act as a second task management system in communication with a first management system including receiving a request from a worker of the first task management system to be assigned a task in the second management system and sending information about completion of the task to the first task management system.

Other special cases can be programmed into the task management system 100.

Operation of the HR Modules

One embodiment the task management system 100 includes a set of HR modules that automatically manage one or more of the following HR functions: recruiting workers, hiring and terminating workers, training workers, paying workers, evaluating workers, certifying workers, and allowing a worker to self-administer his or her work. Depending on the embodiment and the HR functions and on the nature of the tasks of the workers, an embodiment of the system 100 may perform a HR function automatically through software, may assign a HR function as one or more tasks to the system operator, or may define the HR function as one or more tasks for one or more workers and manage the one or more workers completing the HR function tasks.

One embodiment of the task management system 100 is programmed to constrain each HR function to operate within the law of a particular jurisdiction. Thus, in the USA, the system 100 is programmed to show no bias by race, gender, and so forth, and in one embodiment, to store as little of this type of information as possible. One embodiment of the system assigns tasks and hires workers based only on task skills, qualifications and cost.

The following examples of how different embodiments may operate each of the HR functions are not meant to be limiting. Other HR function providing embodiments may carry out more or fewer functions and in a different way.

Recruiting

One embodiment of the task management system 100 enables the system operator to provide forecasts to the system 100 of future projects or increases or decreases in task load. In some embodiments, the customer may directly provide forecasts to the system 100. Providing a project forecast typically includes specifying the required qualifications and any associated task skills, and may include defining new ones.

On embodiment of the capacity manager 317 includes projecting the demand. When the capacity manager 317 projects a peak demand condition that cannot be handled by the current workforce, one embodiment is programmed to first attempt to cause the system 100 to train existing users in the needed task skill by providing the required training scenarios, including in some embodiments emailing existing workers of the availability of the training. If a shortfall is still predicted, the capacity manager 317 causes the system 100 to verify any unverified qualifications in existing workers that would allow them to do the work. If a shortfall is still predicted, the capacity manager causes the system 100 to hire the still-required workers from the applicant pool. If a shortfall is still predicted, the capacity manager 317 causes the system 100 to recruit the required number of workers using the recruiting unit 327.

Figure 6:
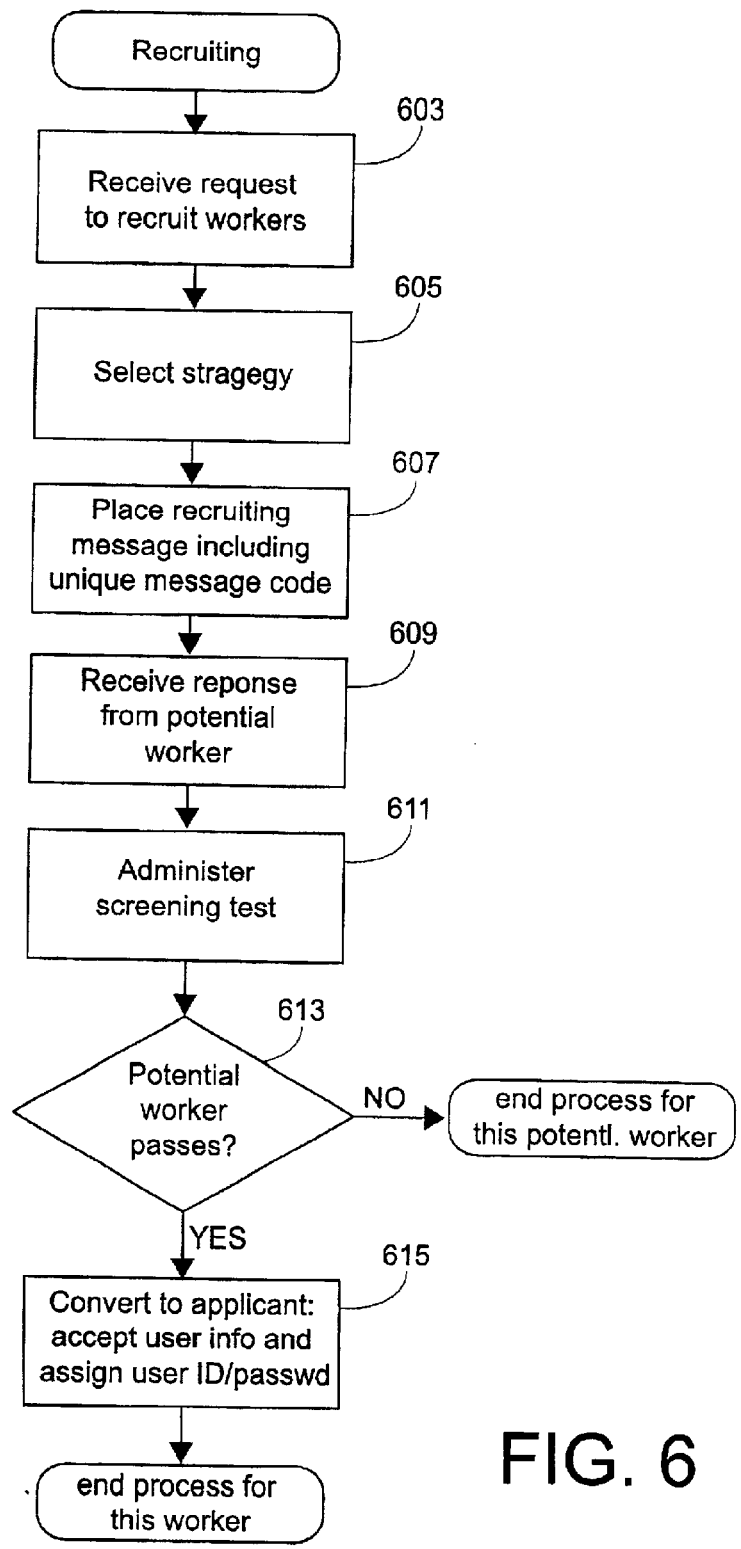
FIG. 6 shows a flowchart of one embodiment of the recruiting process according to one embodiment of the invention.

FIG. 6 shows a flowchart of one embodiment of the recruiting process carried out automatically by the recruiting/screening unit 327. The recruiting unit 327 is coupled to the capacity manager and accepts input (a recruiting request) from the capacity manager that additional workers need to be recruited (step 603). The input includes information such as the required task skill. One embodiment of the recruiting unit 327 is configurable to pursue one or more recruiting campaigns according to different recruiting strategies, including but not limited to a lowest cost strategy and a fastest response result strategy. Thus, in step 605, the recruiting strategy is selected. Step 605 may be a trivial or a null step, for example in the case that the strategy is specified in the recruiting request or that only one strategy is available.

Step 607 of the recruiting campaign includes placing one or more recruiting messages. Depending on the recruiting strategy, the recruiting unit 327 may be configured to pursue one or more of various recruiting actions in step 607, including but not limited to automatically posting one or more recruiting messages on email lists, automatically posting on online job posting boards, automatically placing newspaper classified ads, and automatically sending email requests to human recruiters.

In one embodiment, the recruiting unit 327 is constrained to operate within the law of a particular jurisdiction, e.g., to show no bias to race, gender, religion, and so forth, in the USA. The recruiting messages include a statement that no such bias is being placed, and all steps in the recruiting process are constrained to the law.

In one embodiment of step 607, the recruiting/screening unit 327 assigns a unique code to each recruiting message. The recruiting module requests the code of the potential worker so that the system 100 may assess the effectiveness of different recruiting messages in obtaining workers with certain skills and qualifications.

In one embodiment, the recruiting/screening unit 327 monitors the recruiting process and modifies the recruiting campaign if the campaign appears to not be effective or appears to be too expensive. In one embodiment, the recruiting/screening module notifies the system operator of progress and problems.

Responding Potential Workers

Steps 609 on are carried out for each responding potential worker. A potential worker 331 responds to a recruiting message and in step 609 the recruiting/screening unit 327 receives the response. The recruiting unit 329 attempts to convert the responding potential worker 329 into an applicant 331 by first administering an online screening test to the potential worker. The recruiting unit 329 determines in step 613 if the potential worker has passed the screening test, and if not, ends the process with the potential worker failing. If the potential worker passes, then, in step 615, the recruiting unit 329 receives user information from the potential worker, e.g., as a filled-out on-line application form and converts the potential worker to an applicant. Step 615 includes forming the required entry in the database 217, and assigning a user ID and password to the applicant so that he or she can log in to the system 100.

In one embodiment, the supplied user information is used to mitigate cheating or multiple retakes of the test. Furthermore, the screening test in one embodiment is selected at random from a pool of tests to further mitigate cheating.

An applicant can log onto the task management system 100 and undergo training and take tests that the system makes available to train in any of a set of possible skills and to be certified to a particular level in one or more tasks. Thus, by training in advance, an applicant can be productive in the system 100 immediately upon hiring.

The system 100 stores entered data in one or more tables of the database 217 for each applicant or worker. The data forms the system user's "user profile." The worker or applicant may log onto the system to update his or her profile, including updating his or her qualifications, availability, and work references. A worker's task skills obtained by the applicant undergoing training are automatically maintained by the system by updating the information stored in the database 217.

Any applicant may also review the terms and conditions of performing web work in the system 100.

Hiring

Figure 7:
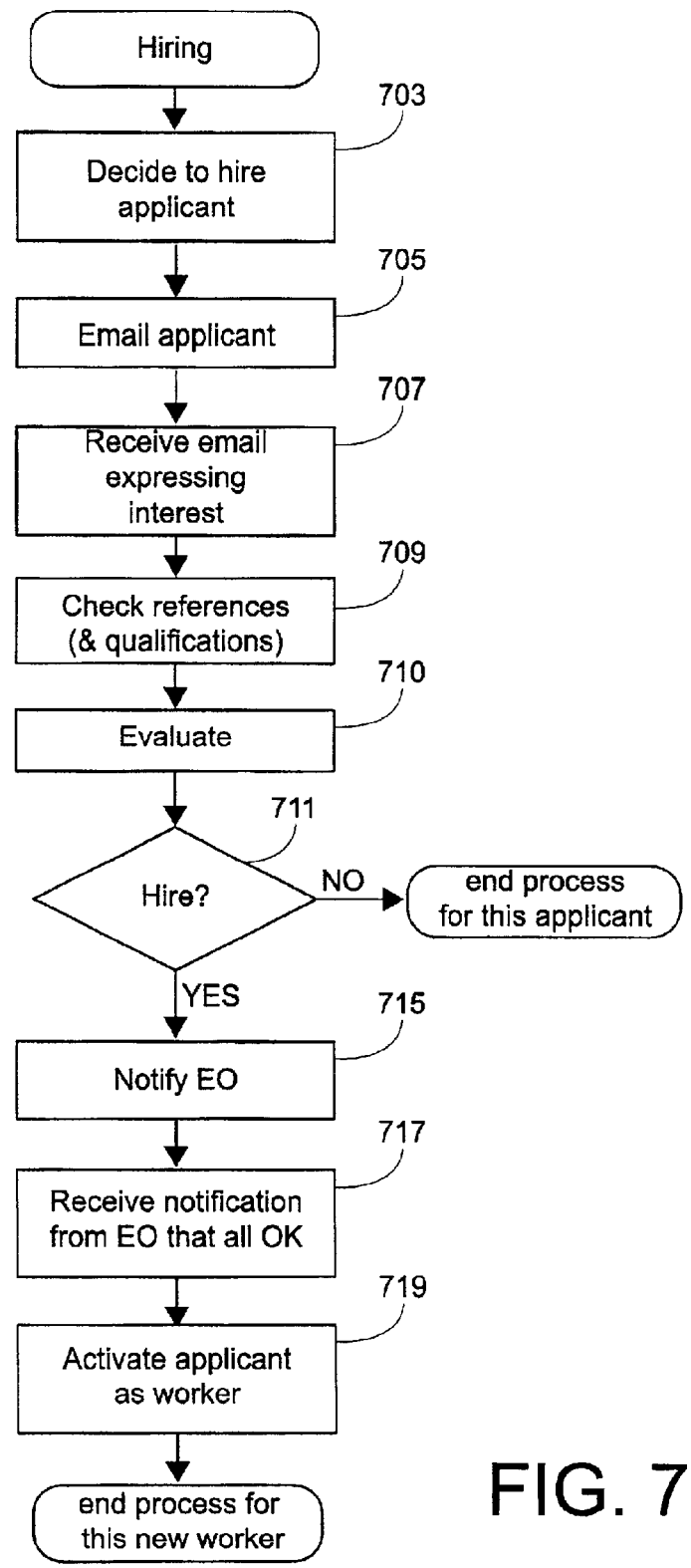
FIG. 7 shows a flowchart of the hiring process carried out by an embodiment of the system 100.

In one embodiment, the task management system 100 makes hiring decisions automatically, i.e., substantially with no human intervention solely based on qualifications and any associated task skills of the applicants. FIG. 7 shows a flowchart of the hiring process carried out by an embodiment of the recruiting/screening unit 327 of the system 100.

In step 703, the recruiting/screening unit 327 decides to hire an applicant. In step 705, the recruiting/screening unit 327 sends an email message to the applicant 331 to request confirming interest. An applicant responds to the email. In step 707 the recruiting/screening unit 327 receives the confirming email from the applicant who is then requested to update his or her availability.

Depending on the qualifications and task skills of the applicant, one or more reference checks and qualification validations may be required. Reference checks and qualification validations are tasks assigned to workers who are managers. The flow chart of FIG. 7 assumes that a reference check is required, so in step 709 one or more reference check task steps are assigned as tasks. Assigning a qualification validation task is similar. Note that in the context of FIG. 3, the reference-checking task may be sent directly to the task dispatcher 1307 or via the preprocessor 305. One embodiment of the task management system 100 provides two levels of reference checks: basic verification of prior employment, and a full reference check. In one embodiment, the system 100 may integrate with other systems or services to perform background checks or credit checks if required for task skill.

Validating a qualification is handled in a manner similar to a reference check. One or more items of information may be associated with a qualification validation task step. Some qualifications also may be validated through an EO or other service provider.

Based on the reference check, the next step is making the hiring decision (710). This step may require a human to make a decision. In such a case, the recruiting/screening unit 327 assigns a hiring decision task to a worker who is a manager who then makes the final determination.

The hiring decision (711) if negative leads to terminating the hiring process or, if positive, continues with step 715 in which the recruiting/screening module sends a notification to the hiring organization that in one embodiment is an EO. Note that a customer 103 may act as the EO. The EO completes the hiring process, including completing any required paperwork, and notifies the system 100 when this is done. In one embodiment, the system 100 may expedite the hiring process by selecting forms from a set of forms, generating pre-populated forms, and emailing the forms to the worker for signature. In one embodiment, these forms are in a common electronic format such as Adobe Portable Document Format (PDF). In step 717, the recruiting/screening unit 327 receives notification from the EO that the applicant has been processed and that all is satisfactory. The recruiting/screening unit 327 now activates the applicant as a worker (step 719) by modifying the applicant's entry in the database 217 so that he or she may work on tasks.

Payroll and Work Submission

A worker working on a task submits the resulting task result via the task management system is 100, e.g., by modifying the database 217 via the network 203. The task submission unit 321 receives the task result by examining and if necessary modifying the appropriate entries in database 217. In one embodiment, the work data in the form of the amount of time taken and the pay rate, is added into the database and appropriate entries related to the worker also are modified.

In addition to the database 217, the system 100 maintains an accounting database that deals with payroll, accounts payable, and accounts receivable. Software modules for payroll, accounts payable, and accounts receivable work together with the accounting database and the database 217. Payroll, for example, is determined by the payroll module querying the database 217 in a read-only manner.

In one embodiment, an included HR administration module monitors each worker and reports to the system operator exception reports with settable thresholds to notify the system operator if unusual conditions arise, such a single worker login performing 80 hours or more of work in one week, a task taking an excessive amount of time, and so forth.

Worker Evaluation and Task Skill

In one embodiment, the evaluation unit 335 of system 100 automatically evaluates worker performance using information gathered from each completed task by querying the database 217. In general, whether or not a task result is to be evaluated is determined by the quality unit 311. A task that is evaluated may lead to a change of task skill and/or task skill level of the worker who carried out the task. See the above discussion on the worker_quality_effect field of a task skill table entry of the task_skill table 425. Based on settable parameters, the system 100 may adjust individual task skills or an overall worker rating in line with the productivity and quality information. As time progresses, a worker's task skill quality levels and rating slowly increases based on positive performance.

In one embodiment, the evaluation unit 335 changes the status of a worker to "probation" after confirmed poor performance. A worker is placed on "probation" for the earliest of a fixed period of time "monitoring period" during which time the worker is required to achieve a consistent high level of performance.

When a task is submitted for evaluation, it is determined whether the worker is on probation. If yes, the worker's task result is evaluated by the evaluation module. Evaluation of a worker includes determining the nature of any drop of performance, which includes determining whether there is a general drop of performance, indicating, for example, that the worker is too tired to work, or whether there is a specific drop of performance indicating, for example, that the worker does not really understand how to do task. If specific, the evaluation unit 335 assesses past performance, e.g., by querying the database 217. After a settable number of consecutive poor performances, the evaluation unit 335 communicates with the certification unit 315, e.g., by modifying the database 217, and causes the worker to be decertified in the specific task skill. Further poor performance causes the worker to be deactivated. These actions are taken automatically by the evaluation unit 335, and may include notifying the system operator. The evaluation unit 335 can also be programmed to create worker review tasks to be carried out by a manager.

When a worker is de-certified by the system 100, a task may be created for a manager to review the problem. In one embodiment, a flag associated with the task skill is settable so that a de-certification for that task skill at that quality level automatically generates a review task for the worker's manager. The manager reviews the data and contacts the worker and makes a determination about whether the system 100's de-certification decision was accurate.

One embodiment of the system 100 also provides for periodic reviews of each worker. In such an embodiment, each user profile (data in the database 217) contains an entry that indicates time or tasks since the last review. The evaluation unit 335 includes a settable threshold for how frequently a review is carried out. A review task is automatically generated for a supervisor when the threshold is exceeded. The supervisor receives as part of the worker review task information summarizing changes and performance since last review. In one embodiment, the supervisor's worker review task includes conducting a telephone interview with the worker. The supervisor review of the worker's rating and task skill affects how the quality unit 311 reacts to worker performance.

A worker may become terminated for one or more reasons. In general, the level of performance that leads to termination is settable by a set of parameters. When a decision is made by the system 100, e.g., by the evaluation module, or by the certification module to terminate a worker, e.g., because a worker has not worked for a settable period of time, or because of repeated poor performance, termination is commenced. In one embodiment, termination includes creating a termination task that is dispatched to a manager who carries out a separation interview. Termination tasks may generate feedback from terminated workers and from supervisors that the system operator may review from time to time.

A worker may request to be terminated. This may be required due to tax or other employment situations.

Information on terminated workers is retained by the system 100 for a settable period of time.

Note that once a worker is terminated, that person is no longer even an applicant. Such a terminated worker may not gain access to the system.

In addition to being terminated, in one embodiment, a worker may become "deactivated" for one or more reasons. In one embodiment, a deactivated worker is a worker who is to be terminated, but still needs to receive all pay prior to the termination date.

Training & Task Skill

The system 100 provides for a number of training scenarios that may be taken by applicants (including workers). The capacity manager 317 determines what training is available. A typical training scenario may include practicing task steps on some available source data.

In one embodiment of the system 100, the training on a particular skill may specify that the applicant have one or more qualifications in order to undergo the training. For example, consider translation training. For one or more reasons, the capacity manager 317 may set the required qualification for the translation training that the applicant be living in one of a set of states, or not be living in one or more geographical regions.

Each training for a particular task skill includes a test to achieve an associated task skill. The training module provides for tests that are automatically scored by the training unit 325, and other tests that need to be scored by a human. In the latter case, a task is created that assigns the test-scoring task to a worker certified to score the test.

As described above, each entry in the task_skill table 425 of the database 217 may include an initial_quality value that indicates the quality related to a worker when the worker first passes the test for this task skill, e.g., 50 out of 100. Each task skill entry may also include a practice_initial_quality value that indicates the quality related to a worker when the worker first starts training on the task skill. The value of practice_quality_increase defines a method to determine the amount by which the worker's quality increases as the worker undergoes training at a level and succeeds, while practice_quality_decrease similarly defines the amount by which the worker's quality decreases after failure. These may be fixed numbers, or in another embodiment, point to an algorithm. Similarly, a worker may be rated by a QA worker and have his or her quality level increase or decrease. The testing_quality_threshold defines the threshold of quality level a worker needs to reach to be allowed to take the test for that task skill.

The screening test in one embodiment is selected at random from a pool of tests to further mitigate cheating.

Note that while one embodiment provides for the training to be part of the system 100, in another embodiment, some or all of the training and testing for a task skill may be done through an integrated third-party package or service.

The Quality Unit 311—Concepts Summary

The quality unit 311 is responsible for determining when a task result should go through a quality process and what quality process should be used. The results of the quality process are sent to both the evaluation unit 335 that determines what changes should be made in worker status and to the task dispatcher 309 that assigns required follow-on tasks such as second opinion QA tasks to confirm a negative rating.

The quality unit 311 determines whether a task result is selected for a QA step by querying the database 217 and making a decision based on one or more criteria: the worker task skill quality level, whether or not the worker is on "probation," and the "default" sampling rate for that task step. Other criteria may be used in alternate embodiments. All these criteria generate an "effective" sampling rate.

The effective sampling rate may be a function of the quality level of the worker in the task skill. When a task skill is first gained by a worker, every task of that worker is subject to QA until the worker achieves a configurable number of successes. After that, as the quality level of the task skill increases for the worker, the effective sampling rate for that task skill is reduced from a default value. For example, all other things being equal, a worker having a quality level of 75 out of 100 on translation will have his or her translation tasks QA sampled less often than a worker that has a quality level of 50 out of 100.

The effective sampling rate may also depend on whether or not the worker has been placed on "probation" status, for example by having a confirmed negative rating(s). For such a worker, every task is sampled until a configurable number of successes is achieved.

Each task step may have a default sampling rate specified in the qa_sampling_rate field of that task step's entry in the task_step table 455 (FIG. 4D).

Overall worker performance (mean time between failure—MTBF—or consecutive successes) can also affect the effective sampling rate.

The task management system 100 provides different types of QA processes. Some types provided for by one embodiment include sequential assessment, parallel assessment, second opinion assessment. Other QA tasks include assessment of previous QA and back checking. See below for more details on these.

When the work product of a task fails the QA step, the task may be returned to the task pool for re-assignment, or may be immediately assigned to a QA worker for repair. See the above discussion on the task_flow_effect field of a task table entry of the task_skill table 425. One embodiment of the system determines whether to return the task to the pool or assign a repair based on configurable parameters and the rating. For example, a task step could be configured so that all tasks rated "marginal" are assigned back to the QA worker for repair and all tasks rated "unacceptable" are returned to the pool to be reworked.

The right to QA a task is determined by possession of a QA task skill that is associated with the worker origin task skill through the task step definition process.

With sequential assessment, the results of a task are passed on to a QA worker who sees the information presented to the prior worker along with the worker's results and then rates the results. Different ratings may be used, and typically include at least one "success" rating and at least one "failure" rating.

Parallel assessment includes dispatching the same task to two different workers. The output of the two workers is automatically compared by the system 100 for a match based on settable criteria such as exact match needed for "success", some fields have a tolerance, and one or more fields may be ignored. Matching results continue automatically and both workers receive a "success" QA rating. If the comparison fails, both results may be assigned to a QA, for example with the differences highlighted. Alternatively, an additional tiebreaker task may be assigned to determine which result is correct, or the results may be dropped and the task returned to the pool for re-assignment. If the results of parallel assessment are forwarded to a QA worker, the QA worker rates both workers and may select one worker's results to repair in the case that task step is configured for repair of results.

In one embodiment, a second-opinion assessment task is triggered when a QA worker rates a worker's result as unacceptable. The original worker's results and the results from the previous QA worker are sent to a second QA worker to confirm the unacceptable rating. Typically, this type of assessment does not affect the flow of the task result. The second QA worker is responsible for agreeing or disagreeing with the "failed" rating. In one embodiment, rather than a sequential second opinion being undertaken, a parallel assessment of the QA task is assigned by the QA task being assigned to two different QA workers. In this case, the system 100 compares the ratings to see if both QA give the same, e.g. "failed" ratings.

Some embodiments of the task management system 100 also provide for assessing the results of QA tasks. One method is to assign the same QA task results to a second QA worker to rate. The system 100 then compares the QA results. Because in some cases, it may be more appropriate to have a second QA worker review the original results and the rating given by the first QA worker, and then rate that QA worker's assessment of the results, the system also provides for such an assessment. The second QA worker typically would be required to have a task skill quality level at least that of the original QA worker.

Some embodiments of the task management system 100 also provide for reviewing previously unchecked results of a worker who subsequently has been found to perform poorly. This is called "back checking." In one embodiment, a worker's losing a task skill triggers a back-check on work he or she has performed using that task skill. A worker who becomes deactivated triggers a back-check on all previous work, not just that involving a particular task skill.

Back checking includes sending the previously un-assessed results through a QA process. In one embodiment, this does not affect the original results until the system operator or a supervisor reviews the back-checking results. Note that some results may have already been sent to the customer 103. Back-check QA tasks typically do not trigger a QA assessment or a second opinion. The system 100 evaluates the results after the initial number of back-checks and, based on the tolerance, either stops or continues the back-check. Back-check results are emailed to the system operator.

In one embodiment, the network 203 is the Internet. Other embodiments may be implemented using any other mechanism of communicating between the one or more customers and the workers. In one operation, some or all of the workers may not be physically remote, while in another implementation, the "customer 103" may be the operator of the task management system 100 that, in this case, is used for in-house management of local workers 105.

A unit of source data for the process of a project may include more than one item, and similarly a unit of result data may include one or more items. The number of items in an input data unit may in general be different from the number of items in a result data unit.

Note that not all versions of the invention include all features. In such a case, referring to FIG. 3, when a module is not included in a version, the information flow is directed to an earlier source. For example, in a version that includes training but not quality assessing, the post processing unit 227 is coupled to the task submission unit 321.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method of automatically managing a plurality of remote workers over a telecommunication network for carrying out a variety of jobs for one or more customers, each job including a process of a set of one or more task steps and a set of units of source data, the method comprising:

storing in a database information on each remote worker including one or more task skills of the worker that define the types of task steps the worker is certified to carry out;

storing in the database information on the customers;

storing in the database information on each process, including the customer of the process, the order of carrying out the task steps of the process, how the input for each task step is obtained from the results of prior task steps in the process, and any pre-processing and post-processing required;

receiving the units of source data from the customers;

carrying out any defined pre-processing for the received source data;

storing in a task data structure information on tasks to be completed, each task defined by a task step and a unit of input for the task step;

storing in the database information on each remote worker including one or more tasks skills of the worker that define the types of task steps the worker is certified to carry out;

receiving requests from one or more of the remote workers for tasks;

upon receiving a task request from a remote worker, dispatching a task from the stored tasks to be completed to the remote worker according to one or more task dispatch rules;

receiving the task result from the remote workers for the task dispatched to the workers;

carrying out any defined post-processing of the task result corresponding to the tasks of a process for a unit of source data to produce result data for the unit of source data;

sending the result data to the customers;

managing the capacity of the system based on information about the stored tasks, assessing the quality of at least some of the task results; and evaluating the workers who carried out the tasks that produced the task results whose quality is assessed, such that the quality assessing and the worker evaluating occur automatically substantially without human management.

2. A method as recited in claim 1, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

3. A method as recited in claim 1, wherein the assessing the quality of at least some of the task results includes determining which task results of which tasks should undergo quality assessment.

4. A method as recited in claim 3, wherein the information stored in the database for at least some task steps includes a default QA sampling rate for the task step, and wherein the determining which task results should undergo quality assessment depends on the default QA sampling rate for the task step that produced the task result.

5. A method as recited in claim 1, wherein the quality assessing of a particular task result includes creating a QA task having the particular task result as input, the QA task being a new task for the method to be dispatched to a QA worker, the QA worker being a worker having a task skill to carry out the task step of the QA task.

6. A system for automatically managing a plurality of remote worker over a telecommunication network for carrying out a variety of jobs for one or more customers, each job including a process of a set of one or more task steps and a set of associated source data units, the system connected to a network, each worker having one or more task skills and able to communicate with the system using a worker terminal connectable to network, the system comprising:

a storage subsystem containing a task data structure to store tasks to be completed, each task defined by a task step and a unit of input for the task step;

a pre-processor coupled to the storage subsystem to accept units of source data from the customers and to carry out any defined pre-processing for the accepted source data;

a task dispatcher coupled to the network and to the task data structure to accept requests from one or more of the remote workers for tasks and to dispatch a task from the task data structure to a remote worker requesting tasks, the dispatching according to one or more task dispatch rules;

a task submission unit coupled to network to receive the task result from the remote workers for the task dispatched to the workers;

a capacity manager coupled to the storage subsystem to manage the capacity of the system based on task load information on the tasks in the task data structure, on the available workers, and on the available worker task skills;

a quality unit coupled to the task submission unit and having the task results as input to assess the quality of at least some of the task results;

a certification unit coupled to the dispatcher to certify workers as having one or more task skills;

an evaluation unit coupled to the storage subsystem to evaluate the workers who carried out the tasks that produced the task results whose quality is assessed; and a post-processor coupled to the network and to the quality unit to produce result data from the task results corresponding to the tasks of a process for a unit of source data, including any defined post-processing of the task results, and to send the result data to the customer of the process, such that the quality unit assesses the quality of the task results and the evaluation unit evaluates workers automatically substantially without human management.

7. A system as recited in claim 6,
wherein the storage subsystem further includes
a database storing information on each remote worker including one or more task skills of the worker that define the types of task steps the worker is certified to carry out, information on one or more customers, and information on each process, the process information including the customer of the process, the order of carrying out the task steps of the process, how the input for each task step is obtained from the results of prior task steps in the process, and any preprocessing and post-processing required; and
a data store for storing input and output information for the tasks, and
wherein the coupling between the certification unit and the task dispatcher, the capacity manager, and the evaluation unit is via the database.

8. A system as recited in claim 6, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

9. A system for automatically managing a plurality of remote workers over a telecommunication network for carrying out a variety of jobs for one or more customers, each job including a process of a set of one or more task steps and a set of associated source data units, the system connected to a network, each worker able to communicate with the system using a worker terminal connectable to network, the system comprising:
a storage subsystem containing
a database storing information on each remote worker including one or more tasks skills of the worker that define the types of task steps the worker is certified to carry out, information on one or more customers, and information on each process, the process information including the customer of the process, the order of carrying out the task steps of the process, how the input for each task step is obtained from the results of prior task steps in the process, and any pre-processing and post-processing required;
a task data structure to store tasks to be completed, each task defined by a task step and a unit of input for the task step; and
a data store for storing input and output information for the tasks;

a mechanism coupled to the storage subsystem to accept units of source data from the customers;
a pre-processor coupled to the storage subsystem to carry out any defined preprocessing for the accepted source data;
a mechanism coupled to the network to accept requests from one or more of the remote workers for tasks;
a task dispatcher coupled to the storage subsystem and to the network for dispatching a task from the task data structure to a remote worker requesting tasks, the dispatching according to one or more task dispatch rules;
a task submission unit coupled to the storage subsystem to receive the task result from the remote workers for the task dispatched to the workers;
a post-processor coupled to the storage subsystem to carry out any defined post-processing of the task results corresponding to the tasks of a process for a unit of source data to produce result data for the unit of source data;
a mechanism coupled to the storage subsystem to send the result data to the customers;
a capacity manager coupled to the storage subsystem to manage the capacity of the system based on task load information on the tasks in the task data structure, on the available workers, and on the available worker task skills;
a quality unit coupled to the storage subsystem to assess the quality of at least some of the task results; and
an evaluation unit coupled to the storage subsystem to evaluate the workers who carried out the tasks that produced the task results whose quality is assessed,
such that the quality unit assesses the quality of task results and the evaluation unit evaluates workers automatically substantially without human management.

10. A system as recited in claim 9, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

11. A method of automatically managing a plurality of workers over a telecommunication network for carrying out a variety of jobs for one or more customers, each job including a process of a set of one or more task steps and a set of units of source data, the method comprising:
storing in a database information on each worker including one or more task skills of the worker that define the types of task steps the worker is certified to carry out;
storing in the database information on each process;
receiving the units of source data;
storing in a task data structure information on tasks to be completed, each task defined by a task step and input for the task step;
storing in the database information on each remote worker including one or more task skills of the worker that define the types of task steps the worker is certified to carry out;
dispatching a task from the stored tasks to be completed to a worker;
receiving the task result from the worker for the task dispatched to the worker after the worker completes the task; and
assessing the quality of at least some of the task results, and wherein the quality assessing occurs automatically substantially without human management.

12. A method as recited in claim 11, further comprising:
producing result data from the task results of the tasks of a process and sending the result data to the customer of the process.

13. A method as recited in claim 11, wherein dispatching is to a remote worker via the Internet and wherein the remote worker completes the task at remote location.

14. A method as recited in claim 13, wherein the storing of process information includes storing information on any required pre-processing of source data and on any required post-processing, and wherein the source data receiving includes carrying out any preprocessing required for the source data according to the stored process information, and wherein the producing result data further includes carrying out any post-processing required according to the stored process information.

15. A method as recited in claim 11, wherein the dispatching occurs upon receiving a task request from the worker.

16. A method as recited in claim 11, wherein the task request is received from the worker automatically when the worker logs on.

17. A method as recited in claim 11, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

18. A method as recited in claim 11, further comprising:
certifying workers as having one or more task skills.

19. A method as recited in claim 18, wherein the dispatching occurs according to a set of one or more dispatch rules.

20. A method as recited in claim 19, wherein the dispatch rules includes that the worker a task is assigned to must have the task skill for the task step.

21. A method as recited in claim 19, wherein the dispatching further occurs to satisfy one or more task dispatch objectives.

22. A method as recited in claim 19, wherein the task data structure is part of the database and wherein the dispatching includes forming a query on the database.

23. A method as recited in claim 22, wherein the database is a relational database including a set of tables.

24. A method as recited in claim 18, wherein the assessing the quality of at least some of the task results includes determining which task results of which tasks should undergo quality assessment.

25. A method as recited in claim 24, wherein the information stored in the database for the skill levels of each worker includes a skill quality level, and wherein the determining which task results should undergo quality assessment depends on the skill quality level of the remote worker that produced the task result.

26. A method as recited in claim 24, wherein the information stored in the database for each remote worker includes a worker status, including whether or not the remote worker is on probation, and wherein the determining which task results should undergo quality assessment depends on whether or not the remote worker that produced the task result is on probation.

27. A method as recited in claim 24, wherein the information stored in the database for at least some task steps includes a default QA sampling rate for the task step, and wherein the determining which task results should undergo quality assessment depends on the default QA sampling rate for the task step that produced the task result.

28. A method as recited in claim 18, wherein the quality assessing of a particular task result includes creating a QA task having the particular task result as input, the QA task being a new task for the method to be dispatched to a QA worker, the QA worker being a worker having a task skill to carry out the task step of the QA task.

29. A method as recited in claim 28, wherein QA tasks are created for at least some of the task results according to a sampling rate for the task step that produced the particular task result.

30. A method as recited in claim 18, further comprising
evaluating the workers who carried out the tasks that produced the task results whose quality is assessed.

31. A method as recited in claim 30, wherein the information stored in the database for the skill levels of each worker includes a skill quality level.

32. A method as recited in claim 30, wherein the information stored in the database for each worker includes a worker status, including whether or not the worker is on probation.

33. A method as recited in claim 32, wherein the evaluating of a worker depends on the status of the worker.

34. A method as recited in claim 33, wherein the information stored in the database for the skill levels of each worker includes a skill quality level, and wherein the evaluation of the worker may have an effect on one or both of the status of the worker and of the skill quality level of the worker.

35. A system for automatically managing a plurality of worker over a telecommunication network for carrying out a variety of jobs for one or more customers, each job including a process of a set of one or more task steps and a set of associated source data units, the system connected to a network, each workers having one or more task skills and able to communicate with the system using a worker terminal connectable to network, the system comprising:
a storage subsystem containing a task data structure to store tasks to be completed, each task defined by a task step and input for the task step from source data received from the customer;
a task dispatcher coupled to the network and to the task data structure to dispatch a task from the task data structure to an available worker;
a task submission unit coupled to network to receive the task result from the worker for the task dispatched to the worker;
a quality unit having the task results as input to assess the quality of at least some of the task results; and
such that the quality unit assesses the quality of at least some of the task results automatically substantially without human management.

36. A system as recited in claim 35, further comprising:
a certification unit coupled to the dispatcher to certify workers as having one or more task skills.

37. A system as recited in claim 36, wherein the recruitment unit further is to screen potential workers, each successfully screened potential worker becoming an applicant.

38. A system as recited in claim 37, wherein the training unit further is to train applicants, and wherein the certification unit further is to certify applicants as having one or more task skills.

39. A system as recited in claim 36,
wherein the storage subsystem further includes
a database storing information on each remote worker including one or more task skills of the worker that define the types of task steps the worker is certified to carry out, information on one or more customers, and information on each process, the process information including the customer of the process, the order of carrying out the task steps of the process, how the input for each task step is obtained from the results of prior task steps in the process, and any preprocessing and post-processing required; and a data store for storing input and output information for the tasks.

40. A system as recited in claim 35, wherein dispatching is to a remote worker via the Internet and wherein the remote worker completes the task at remote location.

41. A system as recited in claim 35, wherein the dispatching occurs upon receiving a task request from the worker.

42. A system as recited in claim 35, wherein the task request is received from the worker automatically when the worker logs on to the system.

43. A system as recited in claim 35, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

44. A system as recited in claim 39, wherein the task data structure is part of the database.

45. A system as recited in claim 39, wherein the data store is part of the database.

46. A system as recited in claim 39, wherein the database is a relational database including a set of tables.

47. A system as recited in claim 39, wherein the quality unit is further to determine which task results of which tasks should undergo quality assessment.

48. A system as recited in claim 47, wherein the quality unit is coupled to the database, wherein information stored in the database for the skill levels of each worker includes a skill quality level, and wherein the determining which task results should undergo quality assessment depends on the skill quality level of the remote worker that produced the task result.

49. A system as recited in claim 47, wherein the quality unit is coupled to the database, wherein the information stored in the database for each remote worker includes a worker status, including whether or not the remote worker is on probation, and wherein the determining which task results should undergo quality assessment depends on whether or not the remote worker that produced the task result is on probation.

50. A system as recited in claim 47, wherein the quality unit is coupled to the database, wherein the information stored in the database for at least some task steps includes a default QA sampling rate for the task step, and wherein the determining which task results should undergo quality assessment depends on the default QA sampling rate for the task step that produced the task result.

51. A system as recited in claim 39, wherein the quality unit is coupled to the task dispatcher, and wherein the quality assessing of a particular task result includes creating a QA task having the particular task result as input, the QA task being a new task for the task dispatcher to be dispatched to a QA worker, the QA worker being a worker having a task skill to carry out the task step of the QA task.

52. A system as recited in claim 51, wherein the quality unit is coupled to the database, and wherein QA tasks are created for at least some of the task results according to a sampling rate for the task step that produced the particular task result.

53. A system as recited in claim 39, further comprising an evaluation unit coupled to the quality unit and to the database to evaluate the workers who carried out the tasks that produced the task results whose quality is assessed.

54. A system as recited in claim 53, wherein the information stored in the database for the skill levels of each worker includes a skill quality level.

55. A system as recited in claim 53, wherein the information stored in the database for each worker includes a worker status, including whether or not the worker is on probation.

56. A system as recited in claim 55, wherein the evaluating of a worker depends on the status of the worker.

57. A system as recited in claim 56, wherein the information stored in the database for the skill levels of each worker includes a skill quality level, and wherein the evaluation of the worker may have an effect on one or both of the status of the worker and of the skill quality level of the worker.

58. A system for automatically managing a plurality of workers over a telecommunication network for carrying out a variety of jobs for one or more customers, each job including a process of a set of one or more task steps and a set of units of source data, the method comprising:

a storage means containing:

a database for storing information on each process and information on each worker including one or more task skills of the worker that define the types of task steps the worker is certified to carry out, and a task data structure for storing information on tasks to be completed, each task defined by a task step and input for the task step;

means for receiving the units of source data;

means for dispatching a task from the stored tasks to be completed to a worker;

means for receiving the task result from the worker for the task dispatched to the worker after the worker completes the task;

means for producing result data from the task results of the tasks of a process and sending the result data to the customer of the process;

means for assessing the quality of at least some of the task results; and means for certifying workers as having one or more task skills.

59. A system as recited in claim 58, wherein the system is coupled to the Internet and wherein the dispatching means dispatches to a remote worker via the Internet and wherein the remote worker completes the task at remote location.

60. A system as recited in claim 58, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

61. A system as recited in claim 58, wherein the assessing the quality of at least some of the task results includes determining which task results of which tasks should undergo quality assessment.

62. A system as recited in claim 61, wherein the information stored in the database for at least some task steps includes a default QA sampling rate for the task step, and wherein the determining which task results should undergo quality assessment depends on the default QA sampling rate for the task step that produced the task result.

63. A system as recited in claim 58, wherein the quality assessing of a particular task result includes creating a QA task having the particular task result as input, the QA task being a new task for the method to be dispatched to a QA worker, the QA worker being a worker having a task skill to carry out the task step of the QA task.

64. A system as recited in claim 58, further comprising
means for evaluating the workers who carried out the tasks that produced the task results whose quality is assessed.

65. A system as recited in claim 64, wherein the information stored in the database for the skill levels of each worker includes a skill quality level and wherein the evaluation of the worker may have an effect on the skill quality level of the worker.

66. A system as recited in claim 64, wherein the information stored in the database for each worker includes a worker status, including whether or not the worker is on probation, and wherein the evaluating of a worker depends on the status of the worker.

67. A carrier medium carrying computer readable code segments to instruct one or more processors of a processing system to carry out a method of automatically managing a plurality of workers over a telecommunication network for carrying out a variety of jobs for one or more customers, each job including a process of a set of one or more task steps and a set of units of source data, the medium comprising:
one or more code segments to instruct the one or more processors to store in a database information on each remote worker and on each process, the worker information including one or more task skills of the worker that define the types of task steps the worker is certified to carry out;
one or more code segments to instruct the one or more processors to store in a task data structure information on tasks to be completed, each task defined by a task step and input for the task step corresponding to source data from the customer of the process of the task step;
one or more code segments to instruct the one or more processors to dispatch a task from the stored tasks to be completed to a worker;
one or more code segments to instruct the one or more processors to accept task result from the worker for the task dispatched to the worker;
one or more code segments to instruct the one or more processors to send result data to the customers;
one or more code segments to instruct the one or more processors to assess the quality of at least some of the task results; and
one or more code segments to instruct the one or more processors to certify applicants and workers as having one or more task skills.

68. A carrier medium as recited in claim 67, wherein dispatching is to a remote worker via the Internet and wherein the remote worker completes the task at remote location.

69. A carrier medium as recited in claim 67, wherein the variety of jobs include a plurality of members of the set consisting of: data entry, telesales, voice transcription, translation, image categorization, sales lead incubation, auditing, repair of documents after OCR, photo retouching, paralegal processes, call center quality assurance, and editorial work.

70. A carrier medium as recited in claim 67, wherein the assessing the quality of at least some of the task results includes determining which task result of which tasks should undergo quality assessment.

71. A carrier medium as recited in claim 67, wherein the quality assessing of a particular task result includes creating a QA task having the particular task result as input, the QA task being a new task for the method to be dispatched to a QA worker, the QA worker being a worker having a task skill to carry out the task step of the QA task.

72. A carrier medium as recited in claim 67, further comprising
one or more code segments to instruct the one or more processors to evaluate the workers who carried out the tasks that produced the task results whose quality is assessed.

73. A carrier medium as recited in claim 72, wherein the information stored in the database for the skill levels of each worker includes a skill quality level and wherein the evaluation of the worker may have an effect on the skill quality level of the worker.

74. A carrier medium as recited in claim 72, wherein the information stored in the database for each worker includes a worker status, including whether or not the worker is on probation, and wherein the evaluating of a worker depends on the status of the worker.

75. A computer implemented method of automatically managing one or more human workers over a telecommunication network for carrying out a process of manipulating source data provided in electronic form to produce result data in electronic form, the process including a set of one or more task steps, each task step having an input corresponding to the source data and when completed on the input resulting in a corresponding task result, the method comprising:
receiving units of source data from a customer;
for each unit of source data
for each task step of the set for the unit of source data;
dispatching the task step and its corresponding input unit to a worker; and
receiving from the worker, after the worker carries out the dispatched task step on the input unit, the task result corresponding to the dispatched task step and input unit,
wherein each worker is certified to have one or more task skills, wherein each task step requires a corresponding task skill, and wherein the dispatching of any task step occurs automatically substantially without human intervention to a worker who is certified to have the corresponding task skill of the task step,
the method further comprising assessing at least some of the task results of at least some of task steps for at least some of the units of source data.

76. A method as recited in claim 75, wherein the task step dispatching is from a server computer system over a network to a remote worker, and wherein the worker carries out the task step at a location remote from the server computer system.

77. A method as recited in claim 75, wherein the source data and the result data is provided in electronic form.

78. A method as recited in claim 75, further comprising, for each unit of source data,
- generating the result data for the unit of source data from one or more of the task results corresponding to the task steps of the set; and
- sending the result data for the unit of source data to the customer.

79. A system as recited in claim 35, further comprising:
- a post-processor coupled to the network and to the quality unit to produce result data from the task results of the tasks a process and to send the result data to the customer of the process.

* * * * *